US012804677B2

(12) United States Patent
Mozaffari et al.

(10) Patent No.: US 12,804,677 B2
(45) Date of Patent: Nov. 17, 2026

(54) RANDOM ACCESS IN A WIRELESS COMMUNICATION NETWORK

(71) Applicant: Telefonaktiebolaget LM Ericsson (publ), Stockholm (SE)

(72) Inventors: Mohammad Mozaffari, Fremont, CA (US); Yi-Pin Eric Wang, Fremont, CA (US); Anders Wallén, Ystad (SE); Yi-Ju Chen, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 479 days.

(21) Appl. No.: 18/548,954

(22) PCT Filed: Mar. 15, 2022

(86) PCT No.: PCT/SE2022/050249
§ 371 (c)(1),
(2) Date: Sep. 5, 2023

(87) PCT Pub. No.: WO2022/197232
PCT Pub. Date: Sep. 22, 2022

(65) Prior Publication Data

US 2024/0155695 A1 May 9, 2024

Related U.S. Application Data

(60) Provisional application No. 63/162,598, filed on Mar. 18, 2021.

(51) Int. Cl.
*H04W 72/232* (2023.01)
*H04L 5/14* (2006.01)
(Continued)

(52) U.S. Cl.
CPC ......... *H04W 72/232* (2023.01); *H04L 5/1469* (2013.01); *H04L 5/16* (2013.01);
(Continued)

(58) Field of Classification Search
CPC ........... H04W 72/232; H04W 74/0833; H04W 74/0866; H04W 74/0836; H04L 5/1469; H04L 5/16; H04L 5/0053
See application file for complete search history.

(56) References Cited

U.S. PATENT DOCUMENTS

2023/0131212 A1* 4/2023 Sun .................. H04W 74/0833 370/329
2023/0189232 A1* 6/2023 Rastegardoost ...... H04L 5/0012 370/329

FOREIGN PATENT DOCUMENTS

EP 3937586 A1 1/2022
EP 3952243 A1 2/2022
(Continued)

OTHER PUBLICATIONS

3GPP, "3GPP TR 38.875 V1.0.0", 3rd Generation Partnership Project; Technical Specification Group Radio Access Network; Study on support of reduced capability NR devices (Release 17), Dec. 2020, 1-71.
(Continued)

*Primary Examiner* — Rebecca E Song
*Assistant Examiner* — Cason H Morse
(74) *Attorney, Agent, or Firm* — Weisberg I.P. Law, P.A.

(57) ABSTRACT

A wireless communication device (12) is configured for random access to a wireless communication network (10). The wireless communication device (12) transmits, to the wireless communication network (10), a random access preamble (14) in a random access channel occasion (18) that comprises one or more symbols. The wireless communication device (12) monitors for a response (20) to the random access preamble (14) within a response window (24). The response window (24) starts in an earliest control resource set (22-2) that begins at least a minimum number (Dmin) of
(Continued)

symbols after the last symbol (18L) of the random access channel occasion (18), wherein the minimum number of symbols is greater than one.

19 Claims, 26 Drawing Sheets

(51) Int. Cl.

| | |
|---|---|
| ***H04L 5/16*** | (2006.01) |
| ***H04W 74/08*** | (2009.01) |
| ***H04W 74/0833*** | (2024.01) |
| *H04W 74/0836* | (2024.01) |

(52) U.S. Cl.
CPC ... *H04W 74/0833* (2013.01); *H04W 74/0866* (2013.01); *H04W 74/0836* (2024.01)

(56) References Cited

FOREIGN PATENT DOCUMENTS

| | | | |
|---|---|---|---|
| WO | 2019098906 | A1 | 5/2019 |
| WO | 2020191760 | A1 | 10/2020 |
| WO | 2020224351 | A1 | 11/2020 |

OTHER PUBLICATIONS

3GPP, "3rd Generation Partnership Project; Technical Specification Group Radio Access Network; NR; Physical layer procedures for control (Release 16)", 3GPP TS 38.213 V16.1.0, Mar. 2020, 1-156.
3GPP, "ETSI TS 138 211 V15.8.0", 5G; NR; Physical channels and modulation (3GPP TS 38.211 version 15.8.0 Release 15), Jan. 2020, 1-100.
3GPP, "ETSI TS 138 331 V15.8.0", 5G; NR; Radio Resource Control (RRC); Protocol specification (3GPP TS 38.331 version 15.8.0 Release 15), Jan. 1, 2020, 1-527.
Ericsson, "Multiple Preamble Transmissions for contention-free random access", 3GPP TSG RAN WG1 Meeting #91, R1-1720949, Reno, Nevada, US, Nov. 27-Dec. 1, 2017, 1-5.
Ericsson, et al., "New WID on support of reduced capability NR devices", 3GPP TSG RAN Meeting #90e, RP-202933, Electronic Meeting, Dec. 7-11, 2020, 1-5.

* cited by examiner

RANDOM ACCESS IN A WIRELESS COMMUNICATION NETWORK

TECHNICAL FIELD

The present application relates generally to a wireless communication network, and relates more specifically to random access in such a network.

BACKGROUND

A wireless communication network, such as a 5G network, may be designed to serve different types of wireless communication devices that have different frequency bandwidth capabilities. For example, a wireless communication network may be designed to provide high data rate service to wireless communication devices capable of communicating over a wide frequency bandwidth, to provide low data rate service to wireless communication devices capable of communicating over a narrow frequency bandwidth, and to provide intermediate data rate service to wireless communication devices capable of communicating over an intermediate frequency bandwidth. In a 5G network, for instance, wireless communication devices capable of communicating over an intermediate frequency bandwidth may include Reduced Capability (RedCap) user equipments (UEs), e.g., where a RedCap UE may be capable of communicating over a 20 MHz bandwidth in a frequency range (FR1) between 410-7,125 MHz and be capable of communicating over a 100 MHz bandwidth in a frequency range (FR2) between 24,250-52,600 MHz.

In such a network, efficiencies in resource utilization and scheduling are realized if the different types of wireless communication devices can share the same carrier, or the same part of a carrier, for random access to the network. Challenges exist, though, in how to configure random access resources suitable for all types of wireless communication devices served by the network. For example, configuring random access resources to span the wide bandwidth supported by wide bandwidth devices improves network capacity, resource utilization, and scheduling flexibility, but jeopardizes random access for other types of devices that do not support such wide bandwidth.

SUMMARY

Some embodiments herein configure and/or perform random access to a wireless communication network in a way that accommodates a wireless communication device's supported frequency bandwidth. For example, some embodiments delay a response window for a random access response and/or delay transmission of the random access response, as needed to accommodate the additional time that some types of wireless communication devices supporting a narrower frequency bandwidth may require for frequency re-tuning. Alternatively or additionally, other embodiments more narrowly tailor the number of random access channel occasions that are frequency division multiplexed to the frequency bandwidth supported by a wireless communication device. Yet other embodiments select the number of random access channel occasions to be frequency division multiplexed to accommodate some types of wireless communication devices that support a wide frequency bandwidth, but designate only a portion of those random access channel occasions as usable by other types of wireless communication devices that only support a narrower frequency bandwidth. These and other embodiments herein enable different types of wireless communication devices to share the same carrier, or the same part of a carrier, for random access to the network, while still proving advantageous in terms of network capacity, resource utilization, and/or scheduling flexibility.

More particularly, embodiments herein include a method performed by a wireless communication device for random access to a wireless communication network. The method comprises transmitting, to the wireless communication network, a random access preamble in a random access channel occasion that comprises one or more symbols. The method also comprises monitoring for a response to the random access preamble within a response window. In some embodiments, the response window starts in an earliest control resource set that begins at least a minimum number (Dmin) of symbols after the last symbol of the random access channel occasion. In some embodiments, the minimum number of symbols is greater than one.

In some embodiments, the method further comprises, after transmitting the random access preamble at a transmit frequency, re-tuning a receiver of the wireless communication device to monitor for the response at a receive frequency. In one or more of these embodiments, the random access preamble is transmitted using a transmitter of the wireless communication device. In some embodiments, re-tuning the receiver comprises re-tuning an oscillator shared between the transmitter and the receiver.

In some embodiments, one or more control resource sets each begin at least one symbol after the last symbol of the random access channel occasion but begin fewer than said minimum number of symbols after the last symbol of the random access channel occasion. In one or more of these embodiments, said earliest control resource set, and each of the one or more control resource sets, is a control resource set that the wireless communication device is configured to receive a Physical Downlink Control Channel, PDCCH, for a Type1-PDCCH common search space, CSS, set. In one or more of these embodiments, the method comprises waiting to monitor for the response until the start of the response window. In some embodiments, said waiting comprises refraining from monitoring for the response during said one or more control resource sets.

In some embodiments, the wireless communication device is a half-duplex frequency division duplex, FDD, device or is operating as a time division duplex, TDD, device.

In some embodiments, the method further comprises selecting the random access channel occasion, in which to transmit the random access preamble, from a set of random access channel occasions that are frequency multiplexed across a frequency bandwidth wider than a transmit bandwidth of the wireless communication device.

In some embodiments, the method further comprises, before the start of the response window, transmitting an indication of a transmit bandwidth of the wireless communication device and/or a receive bandwidth of the wireless communication device.

In some embodiments, the method further comprises, selecting, based on a transmit bandwidth of the wireless communication device, at least one of any one or more of (i) the random access preamble to transmit; (ii) a sequence associated with the random access preamble to transmit; (iii) a format of the random access preamble to transmit; (iv) a length of the random access preamble to transmit; and (v) a time and/or frequency resource for the random access channel occasion in which the random access preamble is to be transmitted.

In some embodiments, the method further comprises, receiving, from the wireless communication network, a random access configuration indicating the minimum number of symbols. In one or more of these embodiments, the random access configuration is included in system information broadcast from the wireless communication network. Alternatively, the random access configuration is received in dedicated Radio Resource Control, RRC, signaling. In one or more of these embodiments, the random access configuration is received from a first cell or on a first carrier, first band, or first frequency. In some embodiments, the random access configuration is applicable for random access to a second cell or on a second carrier, second band, or second frequency.

In some embodiments, the minimum number of symbols is 2, 3, 6, 12, or 24.

In some embodiments, the method further comprises determining the minimum number of symbols based on a radio frequency re-tuning time of the wireless communication device, and/or a subcarrier spacing for the response, and/or a length of the response window, and/or a frequency location of the earliest control resource set.

In some embodiments, the method further comprises determining the minimum number of symbols as a function of $\lceil R/S \rceil$, where R is a radio frequency re-tuning time of the wireless communication device, S is a subcarrier spacing for the response, and ⌈ ⌈ is a ceiling function.

In some embodiments, a reference control resource set is an earliest control resource set that begins at least one symbol after the last symbol of the random access channel occasion. In some embodiments, the reference control resource set starts x symbols after the last symbol of the random access channel occasion. In some embodiments, the method further comprises determining the minimum number of symbols as a function of $\lceil R/S \rceil - x$, where R is a radio frequency re-tuning time of the wireless communication device, S is a subcarrier spacing for the response, and $\lceil\ \rceil$ is a ceiling function.

In some embodiments, the method further comprises determining the minimum number of symbols as a function of whether the wireless communication device is operating as a full-duplex device or a half-duplex device. Additionally or alternatively, the method further comprises determining the minimum number of symbols as a function of whether the wireless communication device is operating as a half-duplex Type A device or a half-duplex Type B device. Additionally or alternatively, the method further comprises determining the minimum number of symbols as a function of whether the wireless communication device is operating as a frequency-division duplex device or a time-division duplex device.

In some embodiments, the method further comprises determining the minimum number of symbols as a function of a transmit frequency at which the wireless communication device transmits the random access preamble. Additionally or alternatively, the method further comprises determining the minimum number of symbols as a function of a receive frequency at which the wireless communication device monitors for the response. Additionally or alternatively, the method further comprises determining the minimum number of symbols as a function of a transmit bandwidth of the wireless communication device.

In some embodiments, the response window starts at a first symbol of said earliest control resource set.

In some embodiments, said earliest control resource set is an earliest control resource set that the wireless communication device is configured to receive a Physical Downlink Control Channel, PDCCH, for a Type1-PDCCH common search space, CSS, set. In some embodiments, said earliest control resource set is an earliest control resource set that begins at least said minimum number of symbols after the last symbol of the random access channel occasion.

Other embodiments herein include a method performed by a radio network node of a wireless communication network. The method comprises receiving, from a wireless communication device, a random access preamble in a random access channel occasion that comprises one or more symbols. The method also comprises transmitting a response to the random access preamble within a response window. In some embodiments, the response window starts in an earliest control resource set that begins at least a minimum number (Dmin) of symbols after the last symbol of the random access channel occasion. In some embodiments, the minimum number of symbols is greater than one.

In some embodiments, the method comprises receiving the random access preamble at a receive frequency and transmitting the response at a transmit frequency different than the receive frequency.

In some embodiments, one or more control resource sets each begin at least one symbol after the last symbol of the random access channel occasion but begin fewer than said minimum number of symbols after the last symbol of the random access channel occasion. In one or more of these embodiments, said earliest control resource set, and each of the one or more control resource sets, is a control resource set that the wireless communication device is configured to receive a Physical Downlink Control Channel, PDCCH, for a Type1-PDCCH common search space, CSS, set. In one or more of these embodiments, the method comprises waiting to transmit the response until at least the start of the response window. In some embodiments, said waiting comprises refraining from transmitting the response during said one or more control resource sets.

In some embodiments, the wireless communication device is operating as a half-duplex frequency division duplex, FDD, device or is operating as a time division duplex, TDD, device.

In some embodiments, the method further comprises monitoring a set of random access channel occasions that are frequency multiplexed across a frequency bandwidth wider than a transmit bandwidth of the wireless communication device.

In some embodiments, the method further comprises, before the start of the response window, receiving an indication of a transmit bandwidth of the wireless communication device and/or a receive bandwidth of the wireless communication device.

In some embodiments, the method further comprises transmitting, to the wireless communication device, a random access configuration indicating the minimum number of symbols. In one or more of these embodiments, the random access configuration is included in system information broadcast from the radio network node. Alternatively, the random access configuration is received in dedicated Radio Resource Control, RRC, signaling. In one or more of these embodiments, the random access configuration is transmitted from a first cell or on a first carrier, first band, or first frequency. In some embodiments, the random access configuration is applicable for random access to a second cell or on a second carrier, second band, or second frequency.

In some embodiments, the minimum number of symbols is 2, 3, 6, 12, or 24.

In some embodiments, the method further comprises determining the minimum number of symbols based on a radio frequency re-tuning time of the wireless communication device, and/or a subcarrier spacing for the response, and/or a length of the response window, and/or a frequency location of the earliest control resource set.

In some embodiments, the method further comprises determining the minimum number of symbols as a function of $\lceil R/S \rceil$, where R is a radio frequency re-tuning time of the wireless communication device, S is a subcarrier spacing for the response, and $\lceil\ \rceil$ is a ceiling function.

In some embodiments, a reference control resource set is an earliest control resource set that begins at least one symbol after the last symbol of the random access channel occasion. In some embodiments, the reference control resource set starts x symbols after the last symbol of the random access channel occasion. In some embodiments, the method further comprises determining the minimum number of symbols as a function of $$\left\lceil \frac{R}{S} \right\rceil - x,$$

where R is a radio frequency re-tuning time of the wireless communication device, S is a subcarrier spacing for the response, and $\lceil\ \rceil$ is a ceiling function.

In some embodiments, the method further comprises determining the minimum number of symbols as a function of whether the wireless communication device is operating as a full-duplex device or a half-duplex device. Additionally or alternatively, the method further comprises determining the minimum number of symbols as a function of whether the wireless communication device is operating as a half-duplex Type A device or a half-duplex Type B device. Additionally or alternatively, the method further comprises determining the minimum number of symbols as a function of whether the wireless communication device is operating as a frequency-division duplex device or a time-division duplex device.

In some embodiments, the method further comprises determining the minimum number of symbols as a function of a transmit frequency at which the wireless communication device transmits the random access preamble. Additionally or alternatively, the method further comprises determining the minimum number of symbols as a function of a receive frequency at which the wireless communication device monitors for the response. Additionally or alternatively, the method further comprises determining the minimum number of symbols as a function of a transmit bandwidth of the wireless communication device.

In some embodiments, the response window starts at a first symbol of said earliest control resource set.

In some embodiments, said earliest control resource set is an earliest control resource set that the wireless communication device is configured to receive a Physical Downlink Control Channel, PDCCH, for a Type1-PDCCH common search space, CSS, set. In some embodiments, said earliest control resource set is an earliest control resource set that begins at least said minimum number of symbols after the last symbol of the random access channel occasion.

Other embodiments herein include a wireless communication device configured for random access to a wireless communication network. The wireless communication device is configured to transmit, to the wireless communication network, a random access preamble in a random access channel occasion that comprises one or more symbols. The wireless communication device is also configured to monitor for a response to the random access preamble within a response window. In some embodiments, the response window starts in an earliest control resource set that begins at least a minimum number (Dmin) of symbols after the last symbol of the random access channel occasion. In some embodiments, the minimum number of symbols is greater than one.

In some embodiments, the wireless communication device is configured to perform the steps described above for a wireless communication device.

Other embodiments herein include a radio network node configured for use in a wireless communication network. The radio network node is configured to receive, from a wireless communication device, a random access preamble in a random access channel occasion that comprises one or more symbols. The radio network node is also configured to transmit a response to the random access preamble within a response window. In some embodiments, the response window starts in an earliest control resource set that begins at least a minimum number (Dmin) of symbols after the last symbol of the random access channel occasion. In some embodiments, the minimum number of symbols is greater than one.

In some embodiments, the radio network node is configured to perform the steps described above for a radio network node.

Other embodiments herein include a computer program comprising instructions which, when executed by at least one processor of a wireless communication device, causes the wireless communication device to perform the steps described above for a wireless communication device. Other embodiments herein include a computer program comprising instructions which, when executed by at least one processor of a radio network node, causes the radio network node to perform the steps described above for a radio network node. In one or more of these embodiments a carrier containing the computer program is one of an electronic signal, optical signal, radio signal, or computer readable storage medium.

Other embodiments herein include a wireless communication device configured for random access to a wireless communication network. The wireless communication device comprises communication circuitry and processing circuitry. The processing circuitry is configured to transmit, to the wireless communication network, a random access preamble in a random access channel occasion that comprises one or more symbols. The processing circuitry is also configured to monitor for a response to the random access preamble within a response window. In some embodiments, the response window starts in an earliest control resource set that begins at least a minimum number (Dmin) of symbols after the last symbol of the random access channel occasion. In some embodiments, the minimum number of symbols is greater than one.

In some embodiments, the processing circuitry is configured to perform the steps described above for a wireless communication device.

Other embodiments herein include a radio network node configured for use in a wireless communication network. The radio network node comprises communication circuitry and processing circuitry. The processing circuitry is configured to receive, from a wireless communication device, a random access preamble in a random access channel occasion that comprises one or more symbols. The processing circuitry is also configured to transmit a response to the random access preamble within a response window. In some embodiments, the response window starts in an earliest control resource set that begins at least a minimum number (Dmin) of symbols after the last symbol of the random access channel occasion. In some embodiments, the minimum number of symbols is greater than one.

In some embodiments, the processing circuitry is configured to perform the steps described above for a radio network node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
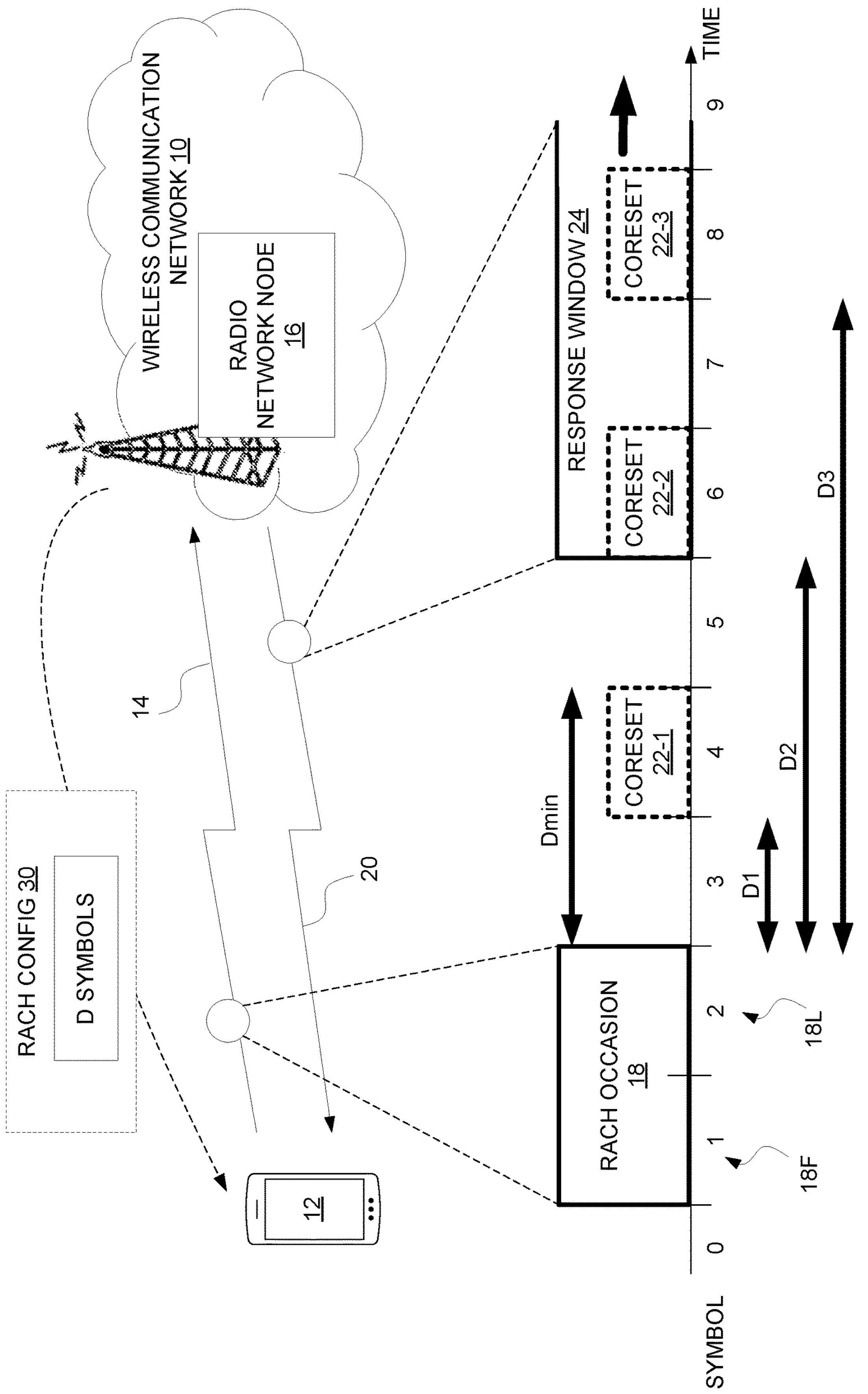
FIG. 1 is a block diagram of a wireless communication network according to some embodiments.

FIG. 1 shows a wireless communication network 10 configured to serve a wireless communication device 12 according to some embodiments. The wireless communication device 12 is configured to perform a random access procedure for random access to the wireless communication network 10. Such random access may for instance be needed for establishing or resuming a connection with the wireless communication network 10 and/or for acquiring uplink synchronization.

To perform random access to the wireless communication network 10, the wireless communication device 12 transmits a random access preamble 14 to a radio network node 16, e.g., a base station. The wireless communication device 12 more particularly transmits the random access preamble 14 in a random access channel (RACH) occasion 18. The RACH occasion 18 comprises one or more symbols in the time domain, e.g., one or more consecutive Orthogonal Frequency Division Multiplexing (OFDM) symbols. In the example of FIG. 1, for instance, the wireless communication device 12 transmits the random access preamble 14 in a RACH occasion 18 that comprises two symbols, indexed in FIG. 1 as symbol 1 and symbol 2, where symbol 1 is the first symbol 18F of the RACH occasion 18 and symbol 2 is the last symbol 18L of the RACH occasion 18. In other embodiments not shown, though, the RACH occasion 18 may comprise more than two symbols, e.g., 4, 6, or 12 symbols.

In any event, after the radio network node 16 receives the random access preamble 14, the radio network node 16 transmits a response 20 to the random access preamble 14. The response 20 may for example convey a timing advance (TA) command, an initial uplink resource grant, and/or an assignment of a Temporary Cell Radio Network Temporary Identifier (TC-RNTI). Regardless, the radio network node 16 transmits the response 20 within a control resource set (CORESET). A control resource set is a set of physical resources that can carry a control channel, e.g., a set of time-frequency resources that carries a Physical Downlink Control Channel (PDCCH). The radio network node 16 transmits the response 20 on such a control channel carried by this set of resources.

In some embodiments, multiple control resource sets recur over time, so as to provide multiple opportunities over time for control channel transmission to the wireless communication device 12. FIG. 1, for example, shows control resources sets 22-1, 22-2, and 22-3 as occurring over time, e.g., control resource set 22-1 occurring in symbol 4, control resource set 22-2 occurring in symbol 6, and control resource set 22-3 occurring in symbol 8. Accordingly, after the radio network node 16 receives the random access preamble 14 in the RACH occasion 18 that occupies symbols 1 and 2, there are multiple opportunities in time for the radio network node 16 to perform a control channel transmission to the wireless communication device 12; namely, in symbols 4, 6, and 8.

However, the radio network node 16 must transmit the response 20 within a window of time referred to as the response window 24. Indeed, it is during this response window 24 that the wireless communication device 12 monitors for the response 20. In fact, according to some embodiments, the wireless communication device 12 is only able and/or only expected to monitor for the response 20 within the response window 24. The wireless communication device 12 may for example wait to monitor for the response 20 until the start of the response window 24, e.g., even if one or more control resource sets occur before the start of the response window 24. This means that transmission of the response 20 before the start of the response window 24 or after the end of the response window 24 would jeopardize the wireless communication device's reception of the response 20.

According to some embodiments, the response window 24 starts in the earliest control resource set that begins at least a minimum number Dmin of symbols after the last symbol 18L of the RACH occasion 18, where Dmin>1. Consider the simple example in FIG. 1 where Dmin=2, where CORESET 22-1 begins D1=1 symbol after the last symbol 18L of the RACH occasion 18, where CORESET 22-2 begins D2=3 symbols after the last symbol 18L of the RACH occasion 18, and where CORESET 22-3 begins D3=5 symbols after the last symbol 18L of the RACH occasion. In this case, the response window 24 starts in CORESET 22-2 because CORESET 22-2 is the earliest CORESET that begins at least Dmin=2 symbols after the last symbol 18L of the RACH occasion 18. Indeed, even though CORESET 22-1 is the earliest (i.e., first) CORESET that occurs after the last symbol 18L of the RACH occasion 18, CORESET 22-1 begins only D1=1 symbol after the last symbol 18L of the RACH occasion 18, i.e., D1<Dmin. And even though CORESET 22-3 occurs at least 2 symbols after the last symbol 18L of the RACH occasion 18, since D3>Dmin, CORESET 22-3 is not the earliest CORESET to do so.

According to some embodiments, then, the start of the response window 24 is effectively delayed for longer than might otherwise be needed to have an opportunity for performing a control channel transmission to the wireless communication device 12, e.g., delayed past the earliest CORESET 22-1. This delay in some embodiments accommodates delay that the wireless communication device 12 needs between transmission of the random access preamble 14 and reception of the response 18. For example, in some embodiments, the wireless communication device's capabilities may dictate that the wireless communication device 12 perform frequency re-tuning before receiving the response 18. In this case, some embodiments effectively delay the response window 24 as needed to accommodate the additional time that the wireless communication device 12 may need for frequency re-tuning.

Figure 2:
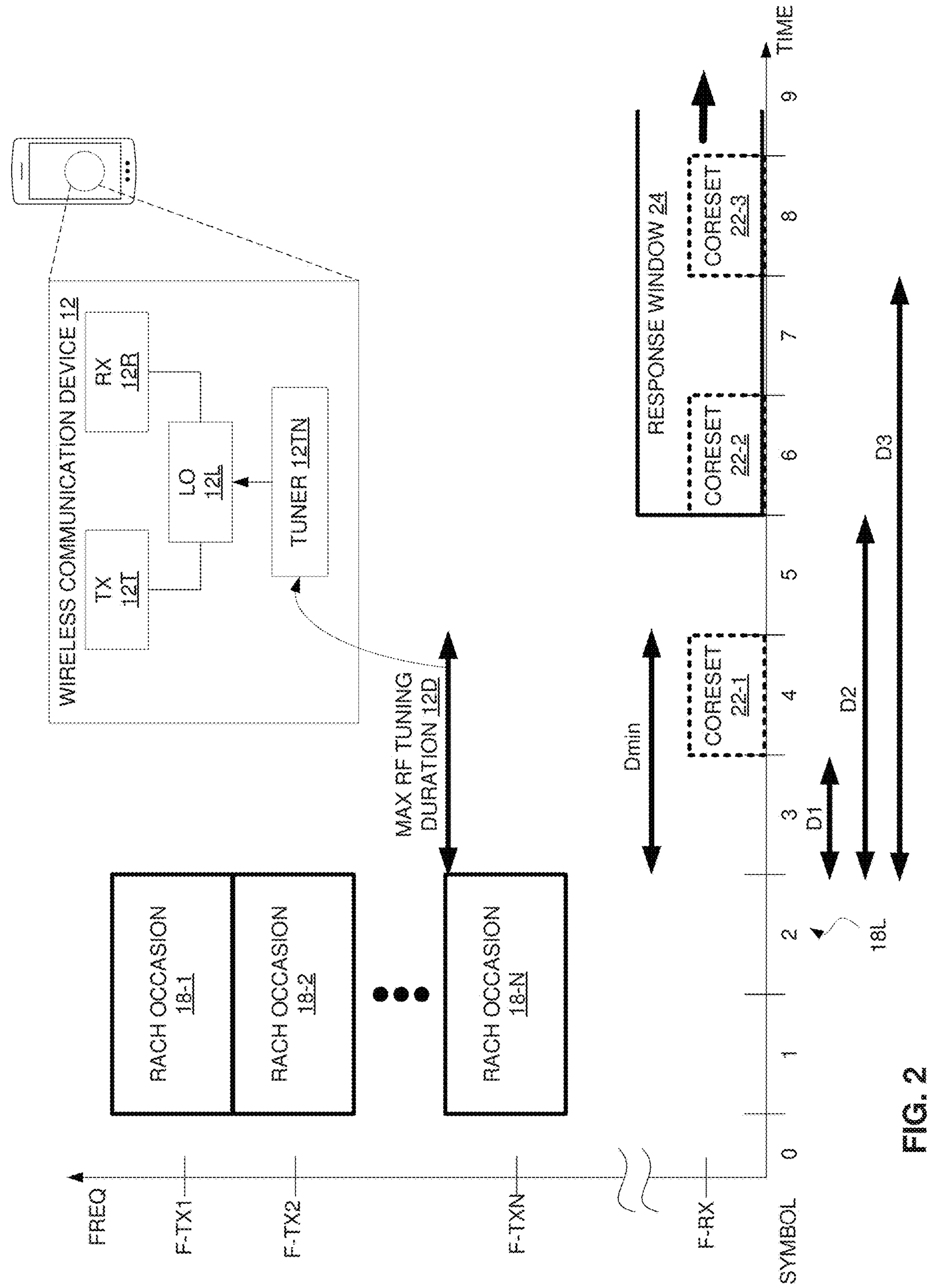
FIG. 2 is a block diagram of random access to accommodate frequency re-tuning by a wireless communication device according to some embodiments.

FIG. 2, for example, shows that some embodiments multiplex RACH occasions 18-1, 18-2, . . . 18-N in frequency, to provide multiple possibilities in the frequency domain for transmission of the random access preamble 14. As shown, for instance, RACH occasion 18-1 is defined at frequency F-TX1, RACH occasion 18-2 is defined at frequency F-TX2, and so on with RACH occasion 18-N defined at frequency F-TXN. That is, the set of RACH occasions 18-1 . . . 18-N are multiplexed across frequencies F-TX1 to F-TXN, all within the same time resources (symbols 1 and 2). Regardless, in this case, the wireless communication device 12 may be configured to select the RACH occasion, in which to transmit the random access preamble 14, from the set of RACH occasions 18-1 . . . 18-N that are frequency multiplexed. For instance, the wireless communication device 12 may select a RACH occasion based on measurement of synchronization signal blocks (SSB).

Notably, in some embodiments, the set of RACH occasions 18-1 . . . 18-N are frequency multiplexed across a frequency bandwidth that is wider than a transmit bandwidth and/or receive bandwidth of the wireless communication device 12, e.g., wider than a transmit bandwidth and/or receive bandwidth configured for the wireless communication device 12, or wider than a maximum possible transmit bandwidth and/or maximum possible receive bandwidth supported by the wireless communication device 12. That is, the transmit bandwidth and/or receive bandwidth of the wireless communication device 12 is less than the frequency bandwidth spanned by the RACH occasions 18-1 . . . 18-N. In some cases, this means that the wireless communication device 12 must perform frequency re-tuning before receiving the response 20 and therefore needs additional time between transmission of the random access preamble 14 and the start of the response window 24.

FIG. 2 shows one example where the wireless communication device 12 is a half-duplex (HD) frequency division duplex (FDD) Type B device, e.g., as may be the case where the wireless communication device 12 is a Reduced Capability (RedCap) user equipment (UE) configured for use in a 5G network. In this case, the frequencies F-TX1 . . . T-TXN at which the random access preamble 14 can be transmitted are each different than the frequency F-RX at which the wireless communication device 12 is to receive the response 20 to that random access preamble 14. Moreover, the wireless communication device 12 is incapable of transmitting and receiving at the same time. FIG. 2 in this regard shows the wireless communication device 12 includes a transmitter (TX) 12T, a receiver (RX) 12R, and a local oscillator (LO) 12L that is shared between the TX 12T and the RX 12R. In order to transmit the random access preamble 14 in a selected one of the RACH occasions 18-1 . . . 18-N, the wireless communication device 12 tunes its transmitter 12T to whichever one of the candidate transmit frequencies F-TX1 . . . F-TXN is associated with the selected RACH occasion. The wireless communication device 12 may for instance include a tuner 12TN that tunes the LO 12L used by the TX 12T to the selected transmit frequency. Such tuning may for example enable a RACH occasion associated with the best or preferred SSB to be within the wireless communication device's transmit bandwidth, i.e., the wireless communication device 12 can retune to an appropriately chosen center frequency for the random access channel transmission so that its preferred RACH occasion is within its transmit bandwidth. After transmitting the random access preamble 14 at that transmit frequency, the wireless communication device 12 tunes its receiver 12R to the receive frequency F-RX at which the response 20 is to be received.

Figure 3:
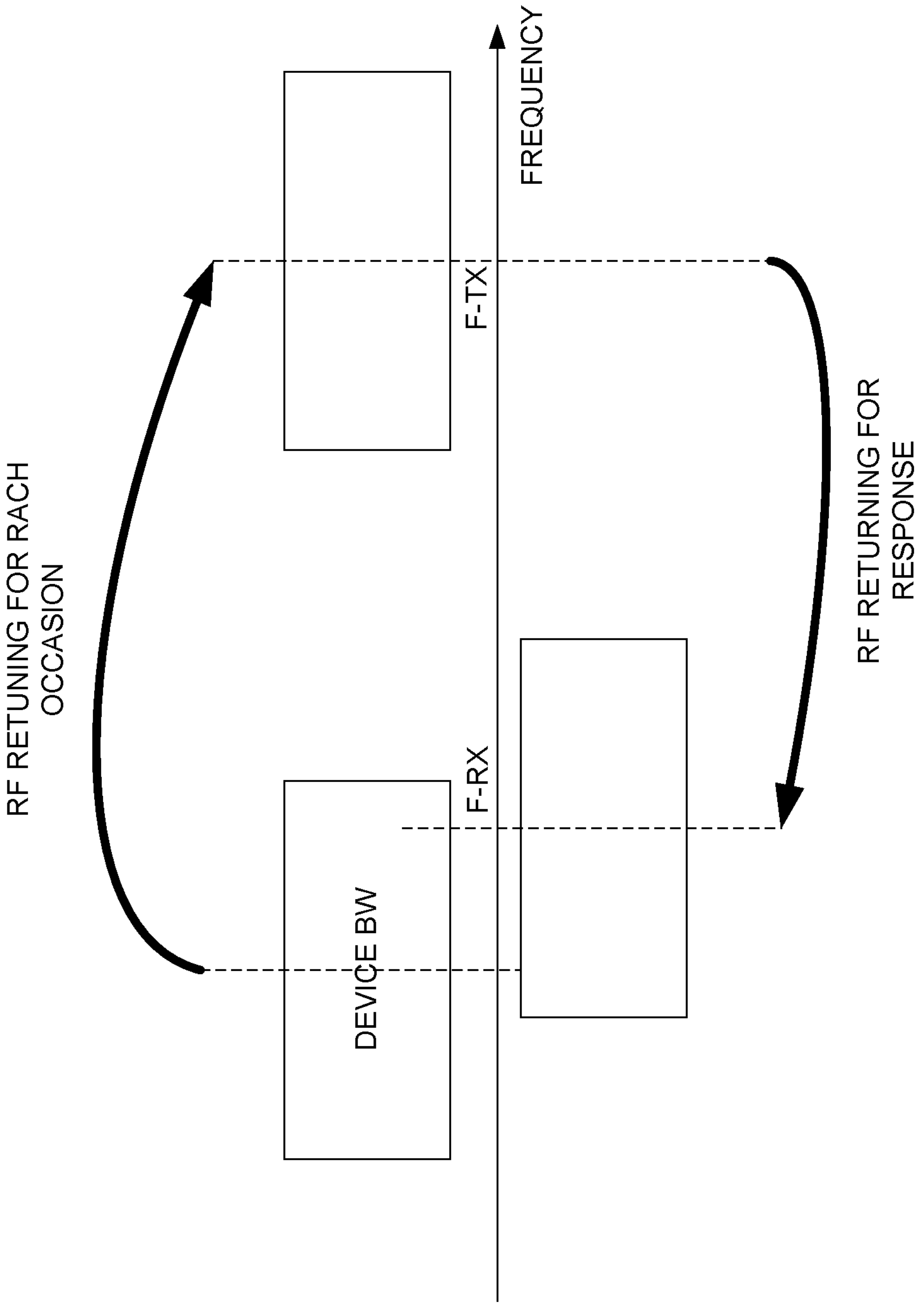
FIG. 3 is a block diagram of frequency re-tuning by a wireless communication device according to some embodiments.

See also, e.g., FIG. 3. This may for instance involve the tuner 12TN re-tuning the LO 12L from the transmit frequency to the receive frequency F-RX. The shared nature of the LO 12L thereby means that the wireless communication device 12 must re-tune the LO 12L between the end of the random access preamble transmission and the start of the response window 24.

In this context, some embodiments effectively delay the response window 24 as needed to accommodate the additional time that the wireless communication device 12 could need for this re-tuning of its receiver 12R. FIG. 2 for example shows that Dmin=2 corresponds to the maximum duration 12D that the wireless communication device 12 may require for radio frequency tuning, e.g., in a worst-case scenario. In order to delay the response window 24 for at least Dmin=2 symbols and thereby accommodate this maximum RF tuning duration 12D, the response window 24 is delayed for D2=3 symbols. This is because the earliest CORESET that starts at least Dmin=2 symbols after the last symbol 18L of the RACH occasion 18 is CORESET 22-2, which starts D2=3 symbols after the last symbol 18L of the RACH occasion 18.

Although illustrated above with respect to a HD FDD Type B device, the embodiments are applicable to other types of devices as well. For example, a time-division duplex (TDD) device similarly includes a LO 12L shared between the device's transmitter 12T and receiver 12R, meaning that time may be required between transmission of the random access preamble 14 and the start of the response window 24 for frequency re-tuning. Alternatively or additionally, some embodiments are applicable for a full-duplex (FD) wireless communication device and/or a HD FDD Type A wireless communication device, since such device(s) may not have the same flexibility (and bandwidth) as that of normal wireless communication devices. In this regard, even though FD and HD FDD Type A devices typically have separate LOs for the transmitter and the receiver, it may be desired not to perform fast re-tuning of these independently, since such retuning of one LO may affect the frequency stability of the other one.

In these and other embodiments, then, the minimum number Dmin of symbols may depend on and/or be adapted based on a radio frequency re-tuning time of the wireless communication device 12, e.g., a maximum time required for radio frequency re-tuning. For example, in embodiments where the wireless communication network 10 is a New Radio (NR) network, the radio frequency re-tuning time for intra-band operation is expected to be 50-200 micro seconds, for operation in the sub 6 GHz frequency range. For a subcarrier spacing (SCS) of 15 kHz, each symbol has a duration of 66.67 micro seconds, meaning that a 50-200 micro seconds radio frequency re-tuning time translates to 0.75-3 symbols. With a requirement that Dmin be greater than 1, this means the minimum number Dmin of symbols may be 2-3 symbols to accommodate for the device's re-tuning time.

As this example demonstrates, though, the minimum number Dmin of symbols in some embodiments may also depend on a subcarrier spacing for the response 20. Table 1 below for example shows the re-tuning time in terms of the number of symbols, for different possible subcarrier spacing.

TABLE 1

RF-retuning time in terms of number of symbols.

| SCS/RF-retuning delay | 50 μs | 100 μs | 200 μs |
|---|---|---|---|
| 15 kHz (symbol duration: 66.67 μs) | 0.75 | 1.5 | 3 |
| 30 kHz (symbol duration: 33.33 μs) | 1.5 | 3 | 6 |
| 60 kHz (symbol duration: 16.67 μs) | 3 | 6 | 12 |
| 120 kHz (symbol duration: 8.33 μs) | 6 | 12 | 24 |

Accordingly, the minimum number Dmin or symbols Herein in some embodiments is more than one symbol and is at least as great as the number of symbols corresponding to the device's maximum re-tuning time. For example, from Table 1, Dmin may be any number of symbols in Table 1 greater than 1, e.g., Dmin may be equal to 2, 3, 6, 12, or 24 symbols, depending on the subcarrier spacing for the response. As Table 1 exemplifies, then, in some embodiments Dmin may be a non-integer, e.g., 1.5 symbols.

In some embodiments, the minimum number Dmin of symbols is fixed, e.g., according to a wireless communication standard. In other embodiments, the minimum number Dmin of symbols has a deterministic value, such that both the radio network node 16 and the wireless communication device 12 are configured to determine the minimum number Dmin of symbols according to the same, deterministic function, e.g., based on the type or capability of the wireless communication device 12, the device's maximum re-tuning time, the device's transmit bandwidth, the device's receive bandwidth, the subcarrier spacing for the response 20, and/or any other one or more parameters. Such function may for instance be specified by a wireless communication standard.

In yet other embodiments, the radio network node 16 determines the minimum number Dmin of symbols and signals that minimum number Dmin to the wireless communication device 12, e.g., such that the minimum number Dmin is configurable by the network 10. In these embodiments, the radio network node 16 as shown in FIG. 1 may transmit, to the wireless communication device 12, a random access configuration 30 that indicates the minimum number Dmin of symbols. Such random access configuration 30 may for example be included in system information broadcast from the wireless communication network 10. System information here may comprise a Master Information Block (MIB) and/or one or more System Information Blocks (SIBs), where the MIB includes information essential for accessing the wireless communication network 10 (e.g., a subcarrier spacing, the location of a common control resource set, a System Frame Number (SFN)). In other embodiments, the random access configuration 30 may be conveyed in dedicated Radio Resource Control (RRC) signaling, e.g., when the wireless communication device 12 is connected to the network 10 in one cell, and is informed about the random access configuration applicable for another cell, carrier, band, or frequency.

No matter which entity determines the minimum number Dmin of symbols, whether the radio network node 16 and/or the wireless communication device 12, such determination may be based on any number of parameter(s) as further detailed below. For example, the determination may be based on a radio frequency re-tuning time of the wireless communication device 12, and/or a subcarrier spacing for the response 20, and/or a length of the response window 24, and/or a frequency location of the earliest control resource set that begins at least one symbol after the last symbol of the RACH occasion 18.

Alternatively or additionally, the minimum number Dmin of symbols may be determined as a function of $\lceil R/S \rceil$, where R is a radio frequency re-tuning time of the wireless communication device 12, S is a subcarrier spacing for the response 20, and $\lceil\ \rceil$ is a ceiling function. This can be generalized such that the minimum number Dmin measured in symbols depends on the numerology used. The dependency can be expressed in terms of a calculation using a formula, or from a table, or a combination of the two. In some embodiments, one single numerology is used both in the uplink and downlink, but they may also be different in other embodiments. The minimum number Dmin of symbols may alternatively or additionally depend on the SCS used for the random access preamble 14, or the SCS used for the response 20, or the SCS used for any other uplink or downlink transmission, or any combination of the above.

In other embodiments, the minimum number Dmin of symbols is defined relative to a reference control resource set. Here, the reference control resource set is an earliest control resource set that begins at least one symbol after the last symbol 18L of the RACH occasion 18 in which the random access preamble 14 is transmitted. The reference control resource set starts x symbols after the last symbol 18L of the RACH occasion 18. In FIG. 1, for example, the reference control resource set is CORESET 22-1, where x=1. In these embodiments, the minimum number Dmin of symbols may be determined as a function of $$\left\lceil \frac{R}{S} \right\rceil - x,$$

where R is a radio frequency re-tuning time of the wireless communication device 12, S is a subcarrier spacing for the response 20, and $\lceil\ \rceil$ is a ceiling function. In general, Dmin can be any integer value that satisfies $$Dmin \geq \left\lceil \frac{R}{S} \right\rceil - x.$$

In an alternative representation, Dmin is defined relative to a reference delay, where the reference delay may be given by the minimum delay applicable for a legacy NR device or, generally, a type of wireless communication device that does not require frequency re-tuning before receiving the response 20. Such a reference delay may, for example, reflect a processing delay in a network node for receiving the random access preamble and preparing a random access response.

Alternatively or additionally, the minimum number Dmin of symbols may be determined as a function of: (i) whether the wireless communication device 12 is a full-duplex device or a half-duplex device; (ii) whether the wireless communication device 12 is a half-duplex Type A device or a half-duplex Type B device; and/or (iii) whether the wireless communication device 12 is operating as a frequency-division duplex (FDD) device or a time-division duplex (TDD) device. More particularly in this regard, in the case of operation in paired spectrum using different frequencies for transmit and receive, referred to as FDD operation, the value of the minimum number Dmin may depend on whether the wireless communication device 12 is a full-duplex (FD), half-duplex (HD) Type A, or HD Type B UE. A FD wireless communication device is capable of transmitting and receiving simultaneously, whereas a HD wireless communication device cannot. A HD-FDD wireless communication device therefore requires time to switch between transmission and reception. An HD-FDD Type A wireless communication device refers to a wireless communication device that is equipped with separate oscillators for transmit and receive chains. An HD-FDD Type A wireless communication device is capable of switching between transmit and receive frequencies in a relatively fast manner because the separate oscillators can be used to tune to transmit and receive frequencies independently. An HD-FDD Type B wireless communication device refers to a wireless communication device that is equipped with an oscillator that is used for both transmit and receive chains. An HD-FDD Type B wireless communication device typically requires a longer switching time between transmission and reception for the oscillator to retune to a different frequency. Thus, the value of the minimum number Dmin may need to be larger (e.g., by a few symbols) for an HD-FDD Type B wireless communication device than for an HD-FDD Type A wireless communication device or an FD-FDD wireless communication device. Furthermore, the value of the minimum number Dmin may need to be larger for an HD-FDD Type A wireless communication device than for an FD-FDD wireless communication device.

In yet another embodiment, the value of the minimum number Dmin may depend on whether the operation band uses paired (e.g. FDD) or unpaired (e.g. TDD) spectrum. A TDD wireless communication device can be expected to share a single oscillator between the transmit and receive chains. Thus, like an HD-FDD Type B wireless communication device, a TDD wireless communication device requires longer switching time if the wireless communication device needs RF retuning between transmission and reception. Thus, the value of the minimum number Dmin may need to be larger (e.g., by a few symbols) for a TDD wireless communication device than for an HD-FDD Type A wireless communication device or an FD-FDD wireless communication device. Furthermore, since the distance, if any, between transmit and receive frequencies in unpaired spectrum can be expected to be considerably smaller than it is for paired spectrum, the value of Dmin may need to be larger for an HD-FDD Type B wireless communication device than for a TDD wireless communication device.

In other embodiments, the minimum number Dmin of symbols is alternatively or additionally determined as a function of a transmit frequency at which the wireless communication device 12 transmits the random access preamble 14 and/or a receive frequency at which the wireless communication device 12 monitors for the response 20. For example, the value of the minimum number Dmin may depend on the actual frequencies configured to be used in the uplink for random access preamble transmission and in the downlink for random access response monitoring. In one embodiment, the minimum number Dmin would be larger if the frequencies are further apart than if they are closer. For example, when the wireless communication device 12 is operating in unpaired spectrum, the frequency ranges used for random access preamble transmission and random access response monitoring may be identical, or the frequency ranges may be close enough such that they both are accommodated within the device's receive and transmit bandwidths. In such cases, the value of the minimum number Dmin may be smaller than if the frequencies are farther apart, e.g., the value of the minimum number Dmin may even be set to the minimum delay applicable for a wireless communication device which does not require additional delay for frequency re-tuning, such as a legacy NR device.

Alternatively or additionally, in some embodiments the minimum number Dmin of symbols is determined as a function of a transmit bandwidth of the wireless communication device 12 and/or a receive bandwidth of the wireless communication device 12. For example, different values of Dmin may be used for different wireless communication devices, e.g., for different types of wireless communication devices that have different bandwidth capabilities. In one embodiment, Dmin can be 1 for legacy wireless communication devices that do not require frequency re-tuning as described above and greater than 1 for reduced bandwidth wireless communication devices which do require frequency re-tuning as described above.

To assist the radio network node's determination of the minimum number Dmin of symbols in embodiments where that minimum number Dmin depends on the device's transmit bandwidth and/or receive bandwidth, the wireless communication device 12 may transmit an indication of the device's transmit bandwidth and/or the device's receive bandwidth. In fact, the wireless communication device 12 may transmit that indication before the start of the response window 24. For example, in some embodiments the indication is conveyed by or in association with the random access preamble 14. In one such embodiment, the wireless communication device 12 transmits a message (referred to as Message 1 or Message A) that includes the random access preamble 14, and the indication is included in that message. In another embodiment, by contrast, the wireless communication device 10 selects one or more transmission parameters for the random access preamble 14 based on the device's (maximum supported) transmit bandwidth and/or receive bandwidth, e.g., such that the selection implicitly conveys the indication. For instance, the wireless communication device 10 may select, based on the device's transmit bandwidth and/or receive bandwidth, the random access preamble 14 to transmit, a sequence associated with the random access preamble 14 to transmit, a format of the random access preamble 14 to transmit, a length of the random access preamble 14 to transmit, and/or a time and/or frequency resource for the RACH occasion in which the random access preamble 14 is to be transmitted.

Alternatively, if the bandwidth capability of the wireless communication device 12 is not known (e.g., in Message 1 or Message A of the random access procedure), the radio network node 16 can use the maximum possible Dmin corresponding to the worst-case scenario for wireless communication devices that need the highest frequency re-tuning delay.

Note that the control resource set(s) referred to in the above embodiments may be a specific type of control resource set(s). For example, in some embodiments, a control resource set as applied to the above embodiments refers to a control resource set (CORESET) that the wireless communication device 12 is configured to receive a Physical Downlink Control Channel (PDCCH) for a Type1-PDCCH common search space (CSS) set. In some embodiments in this regard, a set of PDCCH candidates for the wireless communication device 12 to monitor is defined in terms of PDCCH search space sets. A search space set can be a CSS set that is common to multiple wireless communication devices served by the radio network node 16 or a device specific search space set that is specific to the wireless communication device. In one or more embodiments, a Type1-PDCCH CSS set is a PDCCH CSS set configured by ra-SearchSpace in PDCCH-ConfigCommon for a Downlink Control Information (DCI) format with cyclic redundancy check (CRC) scrambled by a random access (RA) Radio Network Temporary Identifier (RA-RNTI), a MsgB-RNTI, or a Temporary Cell RNTI (TC-RNTI) on the primary cell. Generally, then, the wireless communication device 12 may monitor a set of PDCCH candidates in one or more CORESETs on an active downlink bandwidth part (BWP) on each activated serving cell configured with PDCCH monitoring according to corresponding search space sets where monitoring implies decoding each PDCCH candidate according to the monitored downlink control information (DCI) formats.

In any event, in such embodiments where a control resource set refers to a control resource set (CORESET) that the wireless communication device 12 is configured to receive a Physical Downlink Control Channel (PDCCH) for a Type1-PDCCH common search space (CSS) set, the response window 24 starts in the earliest control resource set (i) that the wireless communication device 12 is configured to receive a PDCCH for a Type1-PDCCH CSS set and (ii) that begins at least a minimum number Dmin of symbols after the last symbol 18L of the RACH occasion 18 corresponding to transmission of the random access preamble 14. In fact, in one or more such embodiments the response window 24 starts in the first (i.e., earliest) symbol of this earliest control resource set. That is, the response window 24 starts at the first symbol of the earliest control resource set (i) that the wireless communication device 12 is configured to receive a PDCCH for a Type1-PDCCH CSS set and (ii) that begins at least a minimum number Dmin of symbols after the last symbol 18L of the RACH occasion 18 corresponding to transmission of the random access preamble 14.

In view of the embodiments described in FIGS. 1-3, FIG. 4 depicts a method performed by a wireless communication device 12 for random access to a wireless communication network 10 in accordance with particular embodiments. The method may include transmitting, to the wireless communication network 10, a random access preamble 14 in a random access channel occasion 18 that comprises one or more symbols (Block 410). The method may also include monitoring for a response 20 to the random access preamble 14 within a response window 24 (Block 420). This response window 24 starts in an earliest control resource set 22-2 that begins at least a minimum number Dmin of symbols after the last symbol 18L of the random access channel occasion 18, where the minimum number Dmin of symbols is greater than one. Alternatively or additionally, the method may include receiving a random access configuration 30 that configures this response window 24 (Block 400).

Figure 4:
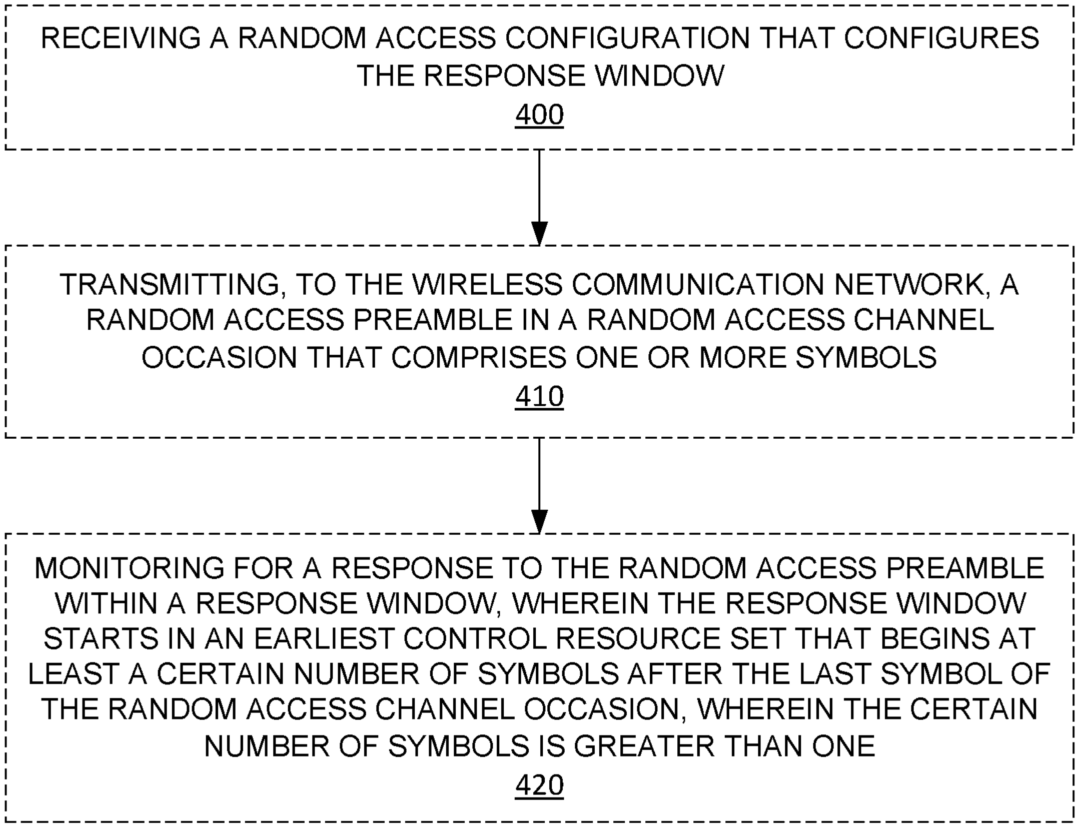
FIG. 4 is a logic flow diagram of a method performed by a wireless communication device according to some embodiments.

Additional aspects of one or more steps of the method in FIG. 4 are enumerated in the EMBODIMENTS section as Embodiments A1-A25 and Embodiments AA1-AA25 in Group A Embodiments.

Figure 5:
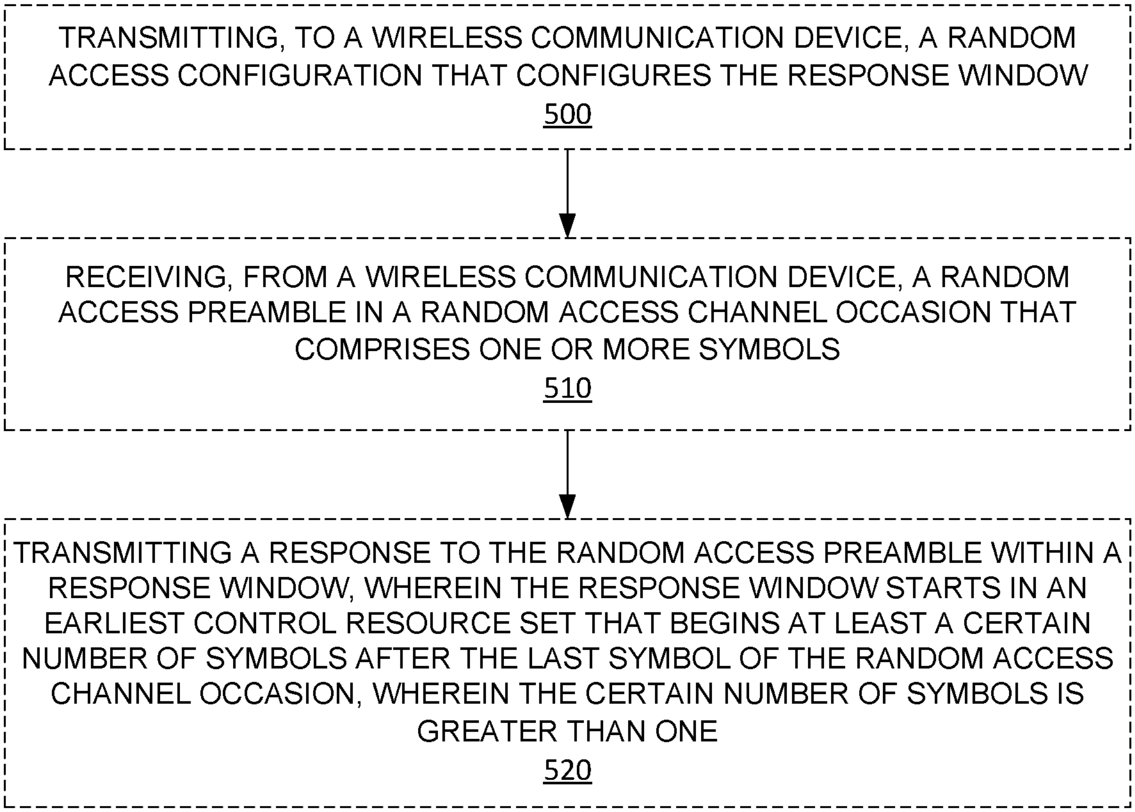
FIG. 5 is a logic flow diagram of a method performed by a radio network node according to some embodiments.

FIG. 5 depicts a corresponding method performed by a radio network node 16 of a wireless communication network 10 in accordance with other particular embodiments. The method may include receiving, from a wireless communication device 12, a random access preamble 14 in a random access channel occasion 18 that comprises one or more symbols (Block 510). The method may also include transmitting a response 20 to the random access preamble 14 within a response window 24 (Block 520). The response window 24 starts in an earliest control resource 22-2 set that begins at least a minimum number Dmin of symbols after the last symbol 18L of the random access channel occasion 18, where the minimum number Dmin of symbols is greater than one. Alternatively or additionally, the method may comprise transmitting, to the wireless communication device 12, a random access configuration 30 that configures this response window 24 (Block 500).

Additional aspects of one or more steps of the method in FIG. 5 are enumerated in the EMBODIMENTS section as Embodiments B1-B23 and Embodiments BB1-BB22 in Group B Embodiments.

Figure 6:
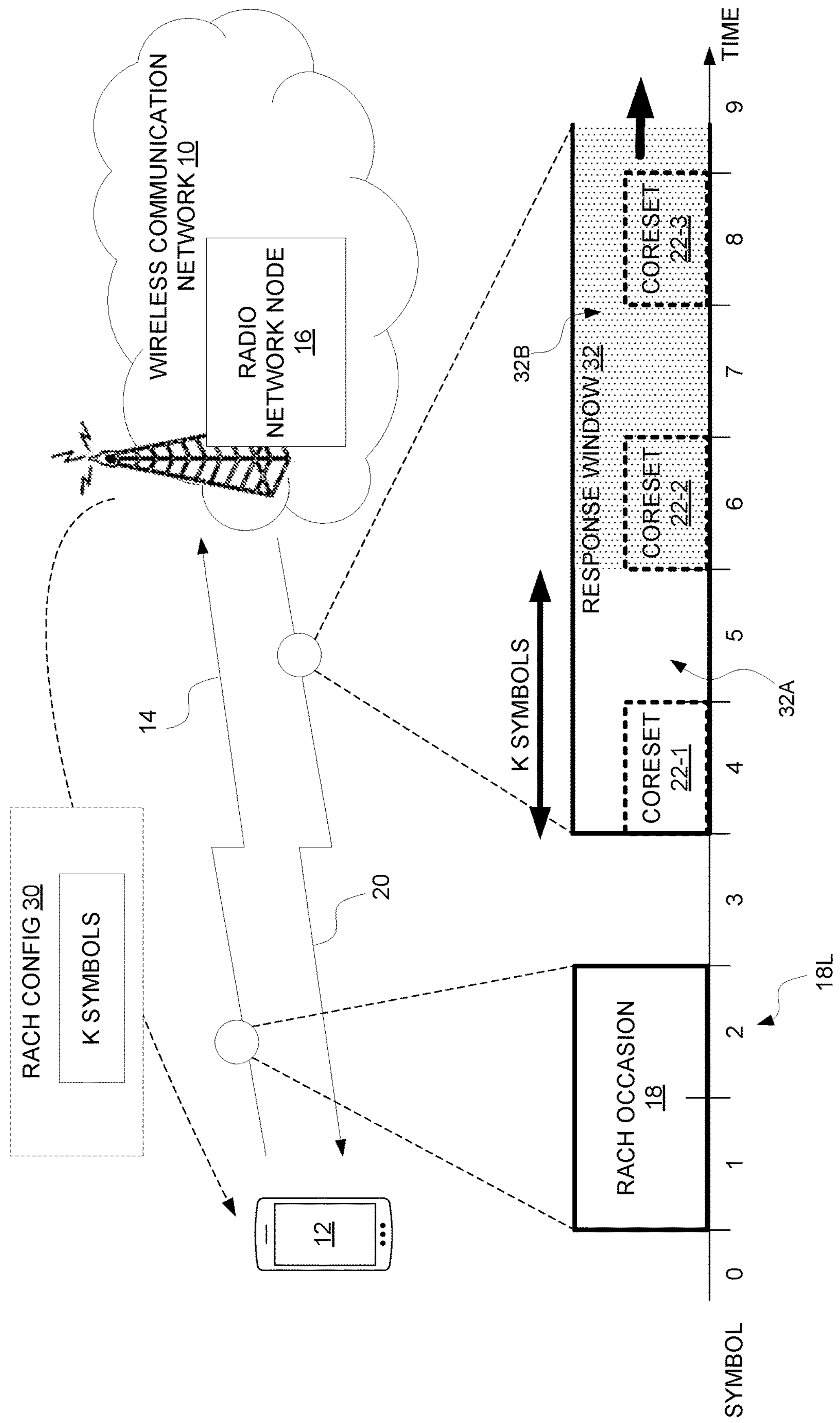
FIG. 6 is a block diagram of a wireless communication network according to other embodiments.

Embodiments above effectively delayed the start of the response window 24, e.g., as needed to accommodate the additional time needed for frequency re-tuning. Other embodiments herein alternatively or additionally delay transmission of the response 20 within a response window, e.g., so that the wireless communication device 10 is expected to monitor for the response 20 during only a portion of the response window. In such a case, then, the accommodation for frequency re-tuning may be realized via delaying transmission of the response 20 within the response window, alternatively or additionally to delaying the start of the response window. FIG. 6 shows one example, with the description thereof being the same as FIG. 1 except as described below.

As shown in FIG. 6, the response window 32 differs from the response window 24 in FIG. 1 in that it starts already at CORESET 22-1, rather than being delayed until CORESET 22-2. For example, in FIG. 6, the response window 32 may start in the earliest control resource set 22-1 that begins at least one symbol after the last symbol 18L of the RACH occasion 18. Regardless, in these and other embodiments, the wireless communication device 12 is configured to monitor for the response 20 during only a portion 32B of the response window 32. Indeed, as shown, the wireless communication device 12 may not monitor for the response 20 during another portion 32A of the response window 32, but instead waits to monitor for the response 20 until a beginning of the portion 32B of the response window 32.

In some embodiments, the portion 32B of the response window 32 that the wireless communication device 12 selectively monitors is a latter portion of the response window 32. In FIG. 6, for instance, this portion 32B begins K symbols after the start of the response window 32, e.g., where K may be 2, 3, 6, 12, or 24. That is, in some embodiments, the start of the response window 32 is not delayed (e.g., to account for frequency re-tuning), but a delay is instead introduced such that the wireless communication device 12 can expect that the response 20 does not start during the first K symbols within the response window 32.

In some embodiments, the number K of symbols may be determined and/or signaled in the same way as described above for the minimum number Dmin of symbols. As one example, the number K of symbols may be determined based on a radio frequency re-tuning time of the wireless communication device 12, and/or a subcarrier spacing for the response 20, and/or a length of the response window 32, and/or a frequency location of the earliest control resource set 22-1.

The embodiments in FIG. 6 may also be applied in the context described in FIGS. 2-3, e.g., where the wireless communication device 12 must perform frequency re-tuning before receiving the response 20 and/or where the RACH occasion 18 is included in a set of RACH occasions that are frequency multiplexed across a frequency bandwidth wider than a transmit bandwidth of the wireless communication device 12.

Figure 7:
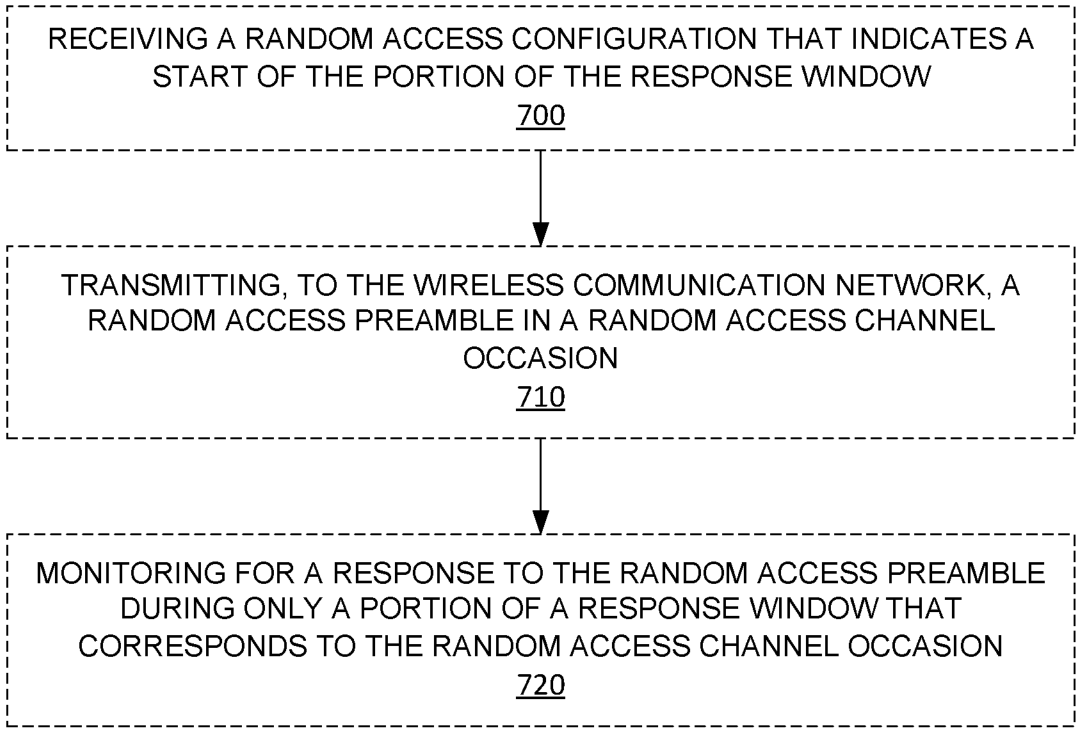
FIG. 7 is a logic flow diagram of a method performed by a wireless communication device according to other embodiments.

In view of the embodiments described in FIG. 6, FIG. 7 depicts a method performed by a wireless communication device 12 for random access to a wireless communication network 10 in accordance with particular embodiments. The method may include transmitting, to the wireless communication network 10, a random access preamble 14 in a random access channel occasion 18 (Block 710). The method may also include monitoring for a response 20 to the random access preamble 14 during only a portion 32B of a response window 32 that corresponds to the random access channel occasion 18 (Block 720). The portion 32B of the response window 32 may for example begin a certain number K of symbols after a start of the response window 32. Alternatively or additionally, the method may include receiving a random access configuration 30 that indicates the start of the portion 32B of the response window 32 (Block 700).

Additional aspects of one or more steps of the method in FIG. 7 are enumerated as Embodiments AAA1-AAA25 in Group A Embodiments.

Figure 8:
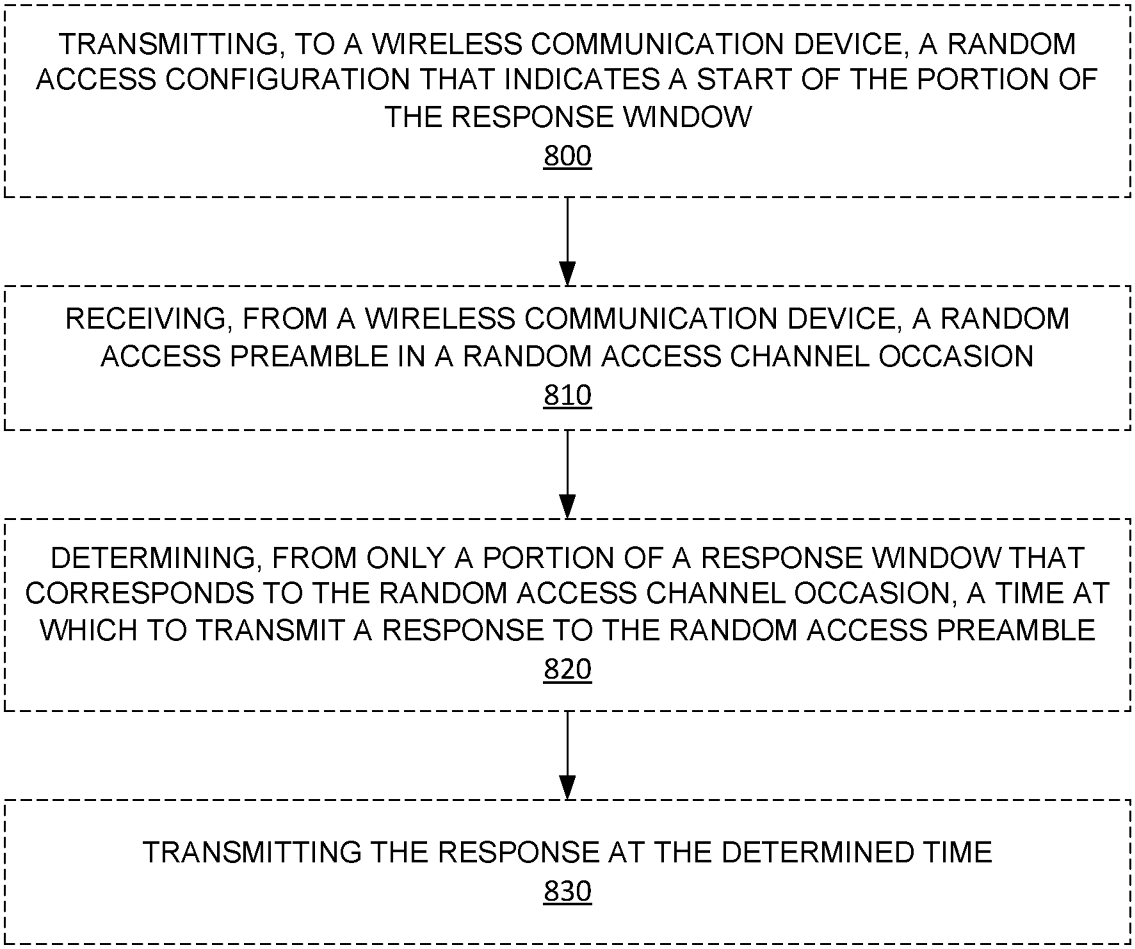
FIG. 8 is a logic flow diagram of a method performed by a radio network node according to other embodiments.

FIG. 8 depicts a corresponding method performed by a radio network node 16 of a wireless communication network 10 in accordance with other particular embodiments. The method may include receiving, from a wireless communication device 12, a random access preamble 14 in a random access channel occasion 18 (Block 810). The method may also determining, from only a portion 32B of a response window 32 that corresponds to the random access channel occasion 18, a time at which to transmit a response 20 to the random access preamble 14 (Block 820). The portion 32B of the response window 32 may for example begin a certain number K of symbols after a start of the response window 32. The method may comprise transmitting the response at the determined time (Block 830). Alternatively or additionally, the method may comprise transmitting a random access configuration 30 that indicates the start of the portion 32B of the response window 32 (Block 800).

Additional aspects of one or more steps of the method in FIG. 8 are enumerated as Embodiments BBB1-BBB22 in Group B Embodiments.

Figure 9:
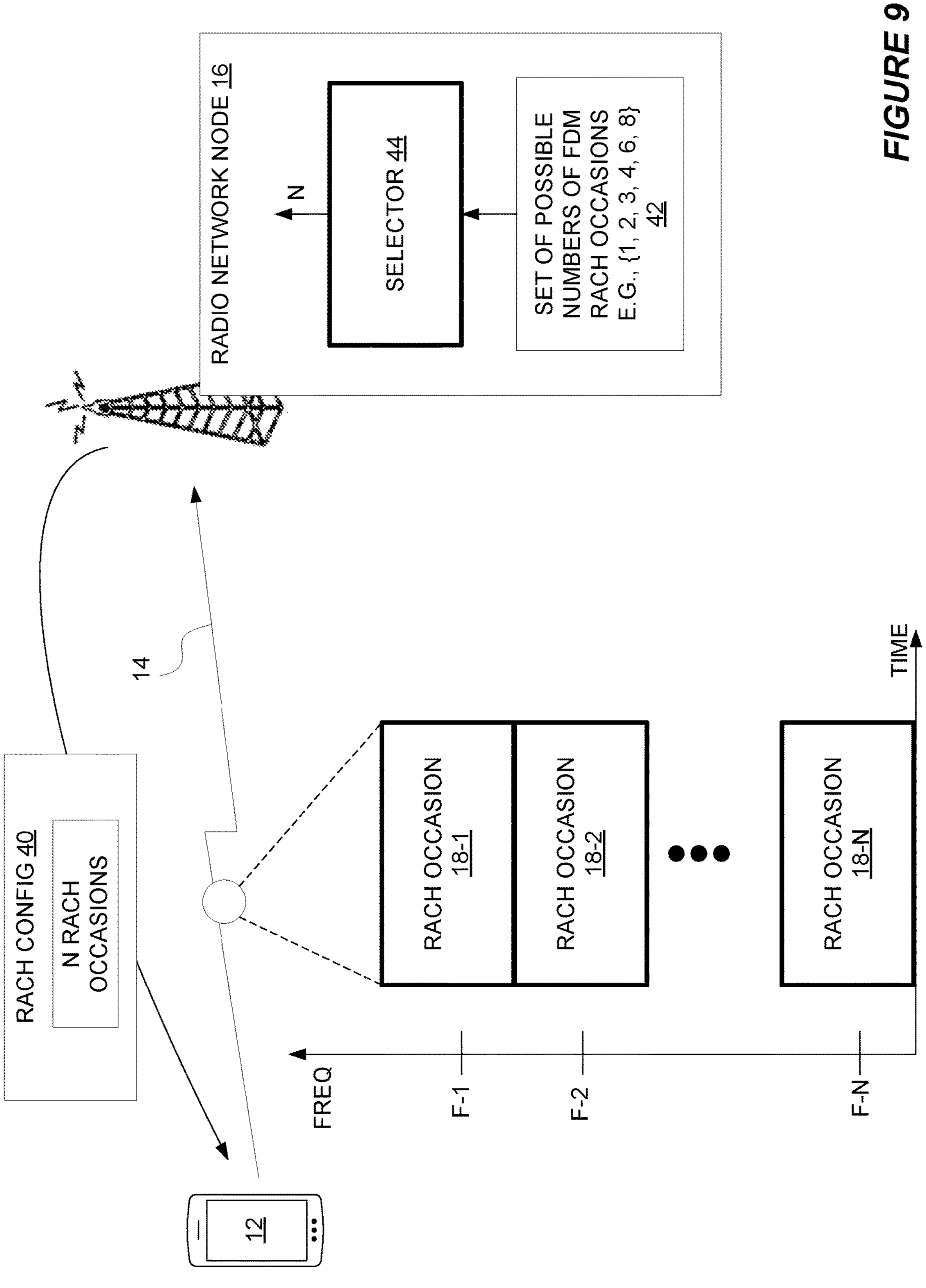
FIG. 9 is a block diagram of a wireless communication network according to still other embodiments.

FIG. 9 illustrates still other embodiments herein that may be implemented in combination with or separately from the other embodiments herein. As shown, a set 42 is defined to include different possible numbers of frequency division multiplexed (FDM) RACH occasions. The set 42 thereby defines the different options for how many RACH occasions can be configured to be frequency division multiplexed, e.g., consecutively in the frequency domain. As shown in FIG. 9, for example, the set 42 includes at least the numbers 1, 2, 3, 4, 6, and 8, meaning that any of 1, 2, 3, 4, 6, and 8 RACH occasions can be frequency division multiplexed.

Regardless of the particular values in the set 42, the radio network node 16 selects, from this set 42, a number N of RACH occasions to be frequency division multiplexed. FIG. 9 for instance shows the radio network node 16 includes a selector 44 for selecting the number N of RACH occasions from the set 42.

The radio network node 16 transmits, to the wireless communication device 12, a RACH configuration 40 that indicates, from the set 42, the number N of RACH occasions to be frequency division multiplexed (in one time domain RACH occasion). The RACH configuration 40 may for example be included in system information broadcast from the wireless communication network, e.g., in an MIB or SIB. Alternatively, the RACH configuration 40 may be included in dedicated RRC signaling. In any event, the wireless communication device 12 correspondingly receives the RACH configuration 40. The wireless communication device 12 may then select, from the number N of RACH occasions 18-1 . . . 18-N to be frequency division multiplexed according to the received RACH configuration 40, a RACH occasion in which to transmit a random access preamble 14. The wireless communication device 12 then transmits the random access preamble 14 in the selected RACH occasion.

Notably, according to some embodiments, the set 42 of possible numbers includes at least one number that is not a power of 2. For example, in one embodiment, the set 42 of possible numbers may include at least 3 and/or 6 and/or 12. In another embodiment, the set 42 of possible numbers includes at least 6 and 8. Or, the set 42 includes at least 4 and 6. Or, the set 42 of possible numbers includes at least 2 and 3.

As concrete examples, the set 42 in one embodiment is {1, 2, 3, 4, 6, 8}. As another example, the set 42 may be {1, 2, 4, 6} or {1, 2, 3, 4}.

In these and other embodiments, the granularity of the possible numbers in the set may advantageously accommodate the (maximum) transmit bandwidth of the wireless communication device 12. In fact, in some embodiments where Nmax is a maximum of the possible numbers included in the set 42, Nmax frequency division multiplexed random access channel occasions span a frequency bandwidth wider than a (maximum) transmit bandwidth of the wireless communication device 12. But, with the set 42 of possible numbers including at least one number that is not a power of 2, other numbers in the set 42 may be more narrowly tailored and appropriate for the device's transmit bandwidth.

Consider an example where the device's transmit bandwidth could accommodate 6 frequency division multiplexed RACH occasions. If the set were to include only {1, 2, 3, 4, 8}, then configuration of 8 RACH occasions would require the wireless communication device 12 to perform frequency re-tuning because at least 2 of those 8 RACH occasions would be outside of the device's transmit bandwidth. On the other hand, configuration of 4 or fewer RACH occasions would not take full advantage of the transmit bandwidth capability of the wireless communication device 12 and thereby sacrifice RACH capacity. According to embodiments herein, though, where the set 42 in one example is {1, 2, 3, 4, 6, 8} so as to include the number 6 (not a power of 2), 6 RACH occasions can be configured so as to be more narrowly tailored to the device's transmit bandwidth. Indeed, in this case, the wireless communication device 12 need not perform frequency re-tuning and the configuration takes full advantage of the device's transmit bandwidth so as not to sacrifice RACH capacity.

To assist the radio network node 16 in selection of N based on the device's transmit bandwidth, the wireless communication device 12 according to some embodiments transmits an indication of a transmit bandwidth of the wireless communication device 12 and/or a receive bandwidth of the wireless communication device 12. This indication may be signaled as described above with respect to FIGS. 1-3.

In some embodiments, then, a random access configuration with new numbers of FDMed RACH occasions is used for reduced bandwidth UEs such that the FDMed RACH occasions fall within the UE bandwidth. In particular, including at least some numbers not a power of 2 decreases the granularity of the possible values for FDMed RACH occasions, as compared to if the set only had numbers that were a power of 2.

In another embodiment, the maximum number of FDMed RACH occasions (Nmax) is determined based on the UE bandwidth:

$$N_{max} = \left\lfloor \frac{B}{q} \right\rfloor,$$

where B is the wireless communication device maximum bandwidth, q is the bandwidth of each RACH occasion which depends on the RACH format and SCS, and $\lfloor\bullet\rfloor$ is the floor function.

In some embodiments, values higher than 8 (e.g., 16) can be introduced for capacity enhancement.

In some embodiments, at least one new number of FDMed RACH occasions ($N_{new}$) that is not a power of 2 can be added to (or included in) an RRC configuration, e.g., as follows (in msg1-FDM_new):

```
RACH-ConfigGeneric ::=         SEQUENCE {
  prach-ConfigurationIndex       INTEGER (0..255),
  msg1-FDM_new                     ENUMERATED {one, two, four, eight, N_new},
  msg1-FrequencyStart            INTEGER (0..maxNrofPhysicalResourceBlocks-1),
  zeroCorrelationZoneConfig        INTEGER(0..15),
  preambleReceivedTargetPower          INTEGER (-202..-60),
  preambleTransMax              ENUMERATED {n3, n4, n5, n6, n7, n8, n10, n20, n50, n100,
n200},
  powerRampingStep               ENUMERATED {dB0, dB2, dB4, dB6},
  ra-ResponseWindow              ENUMERATED {sl1, sl2, sl4, sl8, sl10, sl20, sl40, sl80},
  ...
}
```

Figure 10:
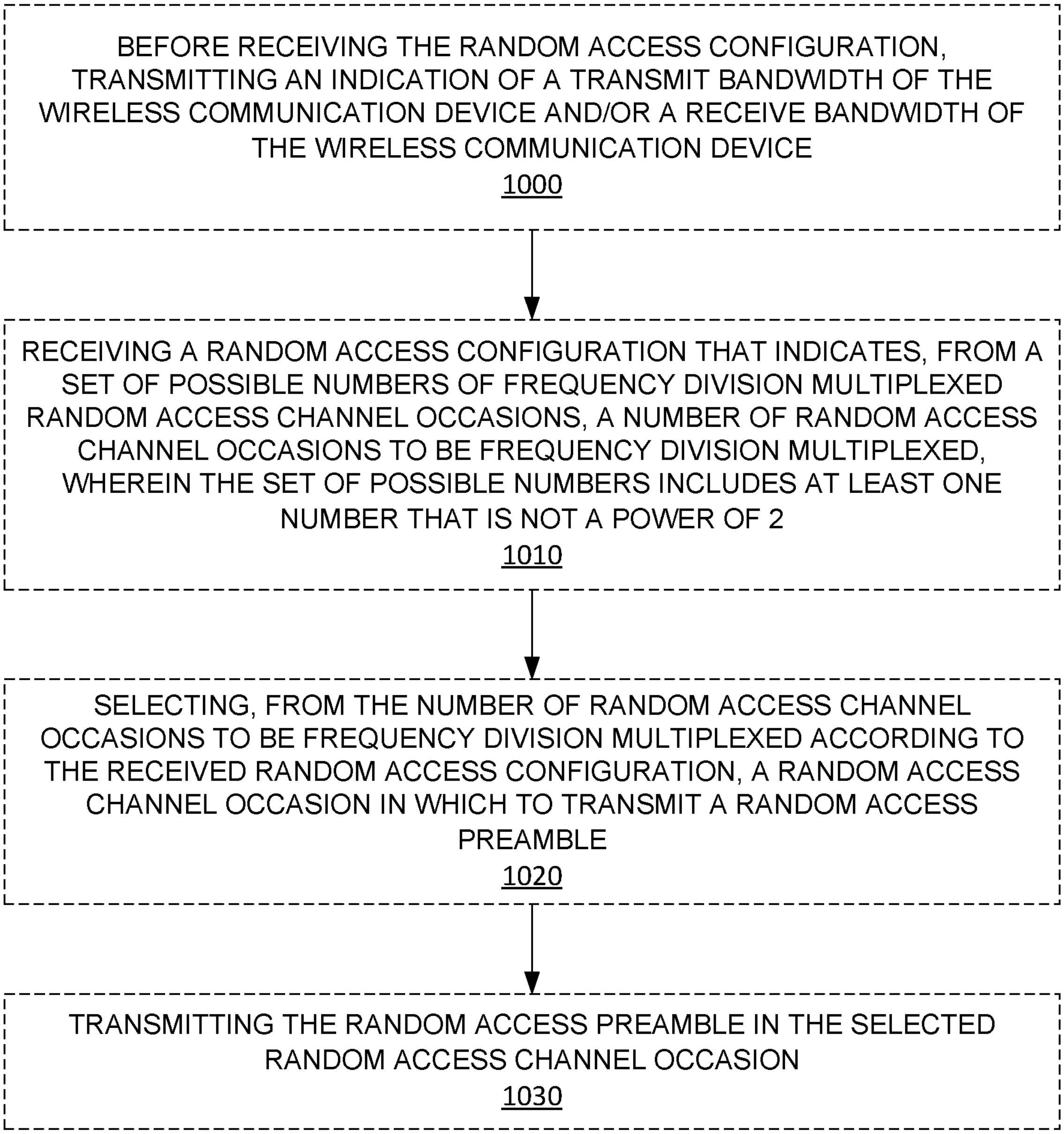
FIG. 10 is a logic flow diagram of a method performed by a wireless communication device according to still other embodiments.

It should be noted that the above change to the RACH-ConfigGeneric Information Element merely serves as an illustrative example. There are several options for how this extension can be introduced in a standard in terms of added extension fields or redefinitions of existing information elements In view of the embodiments described in FIG. 9, FIG. 10 depicts a method performed by a wireless communication device 12 for random access to a wireless communication network 10 in accordance with particular embodiments. The method may include receiving a random access configuration 40 that indicates, from a set 42 of possible numbers of frequency division multiplexed random access channel occasions, a number N of random access channel occasions to be frequency division multiplexed, where the set 42 of possible numbers includes at least one number that is not a power of 2 (Block 1010). The method may also include selecting, from the number N of random access channel occasions to be frequency division multiplexed according to the received random access configuration 40, a random access channel occasion in which to transmit a random access preamble 14 (Block 1020). The method may then include transmitting the random access preamble 14 in the selected random access channel occasion (Block 1030). Alternatively or additionally, the method may include, before receiving the random access configuration 40, transmitting an indication of a transmit bandwidth of the wireless communication device 12 and/or a receive bandwidth of the wireless communication device 12 (Block 1000).

Additional aspects of one or more steps of the method in FIG. 10 are enumerated as Embodiments X1-X17 in Group X Embodiments.

Figure 11:
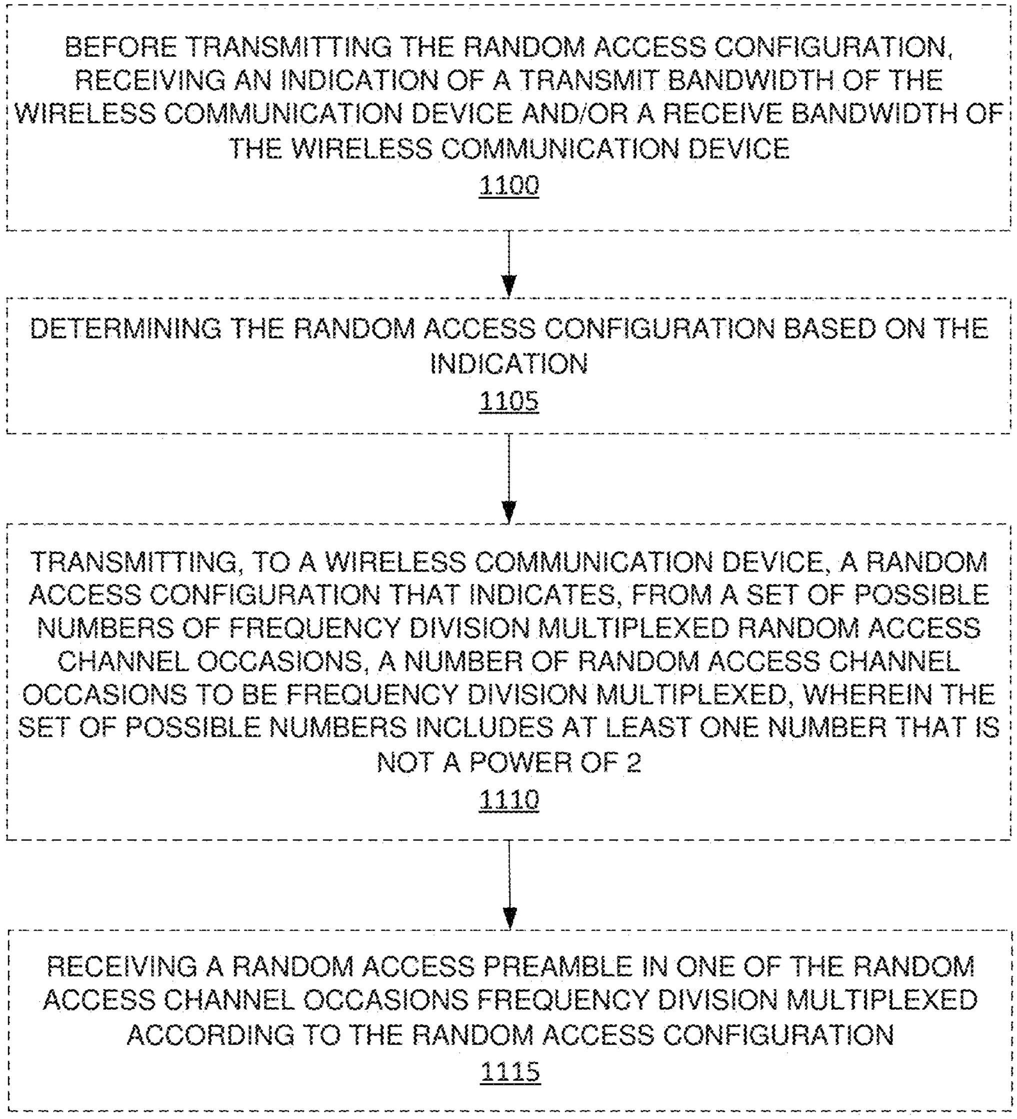
FIG. 11 is a logic flow diagram of a method performed by a radio network node according to still other embodiments.

FIG. 11 depicts a corresponding method performed by a radio network node 16 of a wireless communication network 10 in accordance with other particular embodiments. The method may include transmitting, to a wireless communication device 12, a random access configuration 40 that indicates, from a set 42 of possible numbers of frequency division multiplexed random access channel occasions, a number N of random access channel occasions to be frequency division multiplexed, where the set 42 of possible numbers includes at least one number that is not a power of 2 (Block 1110). The method in some embodiments may also comprise receiving a random access preamble in one of the random access channel occasions frequency division multiplexed according to the random access configuration 40 (Block 1120). Alternatively or additionally, the method may include, before transmitting the random access configuration 40, receiving an indication of a transmit bandwidth of the wireless communication device 12 and/or a receive bandwidth of the wireless communication device 12 (Block 1100). The method in this case may include determining the random access configuration 40 based on the indication (Block 1105).

Additional aspects of one or more steps of the method in FIG. 11 are enumerated as Embodiments Y1-Y15 in Group Y Embodiments.

Figure 12:
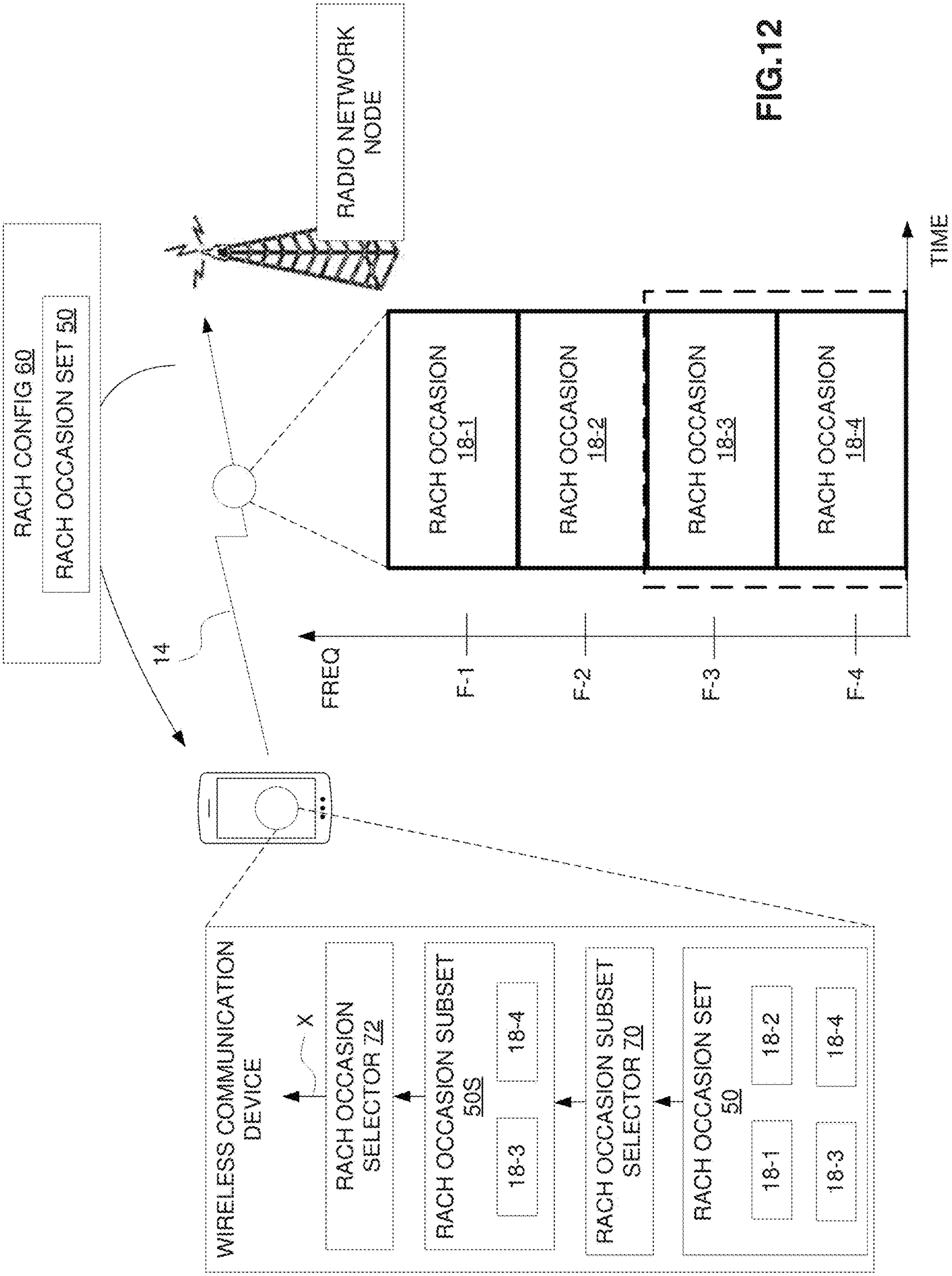
FIG. 12 is a block diagram of a wireless communication network according to yet other embodiments.

FIG. 12 illustrates still other embodiments herein. In these embodiments, the wireless communication device 12 receives a random access configuration 60 indicating a set 50 of frequency division multiplexed RACH occasions. In the example of FIG. 12, this set 50 includes RACH occasions 18-1, 18-2, 18-3, and 18-4. The random access configuration 60 may indicate this set 50 by, for instance, indicating the number of RACH occasions to be included in the set, e.g., 4 in this example.

Rather than considering all RACH occasions in the indicated set 50 as candidates for selecting a RACH occasion in which to transmit a random access preamble 14, though, the wireless communication device 12 according to these embodiments limits its selection from among a proper subset of the RACH occasions in the set 50. That is, the wireless communication device 12 considers only a portion of the RACH occasions in the set 50 as candidates for selection. In these embodiments, then, the wireless communication device 12 as shown selects, from a proper subset 50S of frequency division multiplexed RACH occasions included in the set 50, a RACH occasion in which to transmit a random access preamble 14. In the example shown, this proper subset 50S includes only RACH occasions 18-3 and 18-4, so as to exclude RACH occasions 18-1 and 18-2.

The wireless communication device 12 in FIG. 12 for example includes a RACH occasion subset selector 70 that selects the proper subset 50S from the set 50. The RACH occasion subset selector 70 provides this proper subset 50S as input to a RACH occasion selector 72. It is from this proper subset 50S, not the full set 50, that the RACH occasion selector 72 selects a RACH occasion X in which to transmit a random access preamble 14.

In some embodiments, the frequency division multiplexed RACH occasions included in the set 50 span a frequency bandwidth wider than a transmit bandwidth of the wireless communication device 12, whereas the frequency division multiplexed RACH occasions included in the proper subset 50S span a frequency bandwidth less than or equal to the transmit bandwidth of the wireless communication device 12. This way, the frequency division multiplexed RACH occasions included in the proper subset 50S are positioned within a transmit bandwidth of the wireless communication device 12. In these and other embodiments, then, the proper subset 50S may be configured or selected so as to accommodate the wireless communication device's (maximum) transmit bandwidth.

In some embodiments, the proper subset 50S is signaled to the wireless communication device 12, e.g., within the random access configuration 60. In other embodiments, the proper subset 50S is preconfigured or deterministic according to one or more rules known to both the radio network node 16 and the wireless communication device 12. For example, in some embodiments, the frequency division multiplexed RACH occasions included in the proper subset 50S are positioned in frequency below a maximum frequency, are positioned in frequency above a minimum frequency, or are positioned in frequency between the maximum frequency and the minimum frequency. For example, the proper subset 50S may correspond to the configured RACH occasions with lowest frequencies, or to the configured RACH occasions with the highest frequencies, or to the RACH occasions in the center. The example in FIG. 12 in this regard shows that the proper subset 50S includes the RACH occasions with the lowest frequencies, e.g., F3 and F4.

Generally, then, in some embodiments, the set of RACH occasions in the frequency domain applicable for the wireless communication device 12 is further restricted. As a non-limiting example, if multiple RACH occasions in the frequency domain are configured such that these extend the wireless communication device's transmit bandwidth, only a subset of these can be used by the wireless communication device 12. In one such embodiment, the set of FDMed RACH occasions applicable to the wireless communication device 12 are limited to ones within the device's uplink bandwidth.

Figure 13:
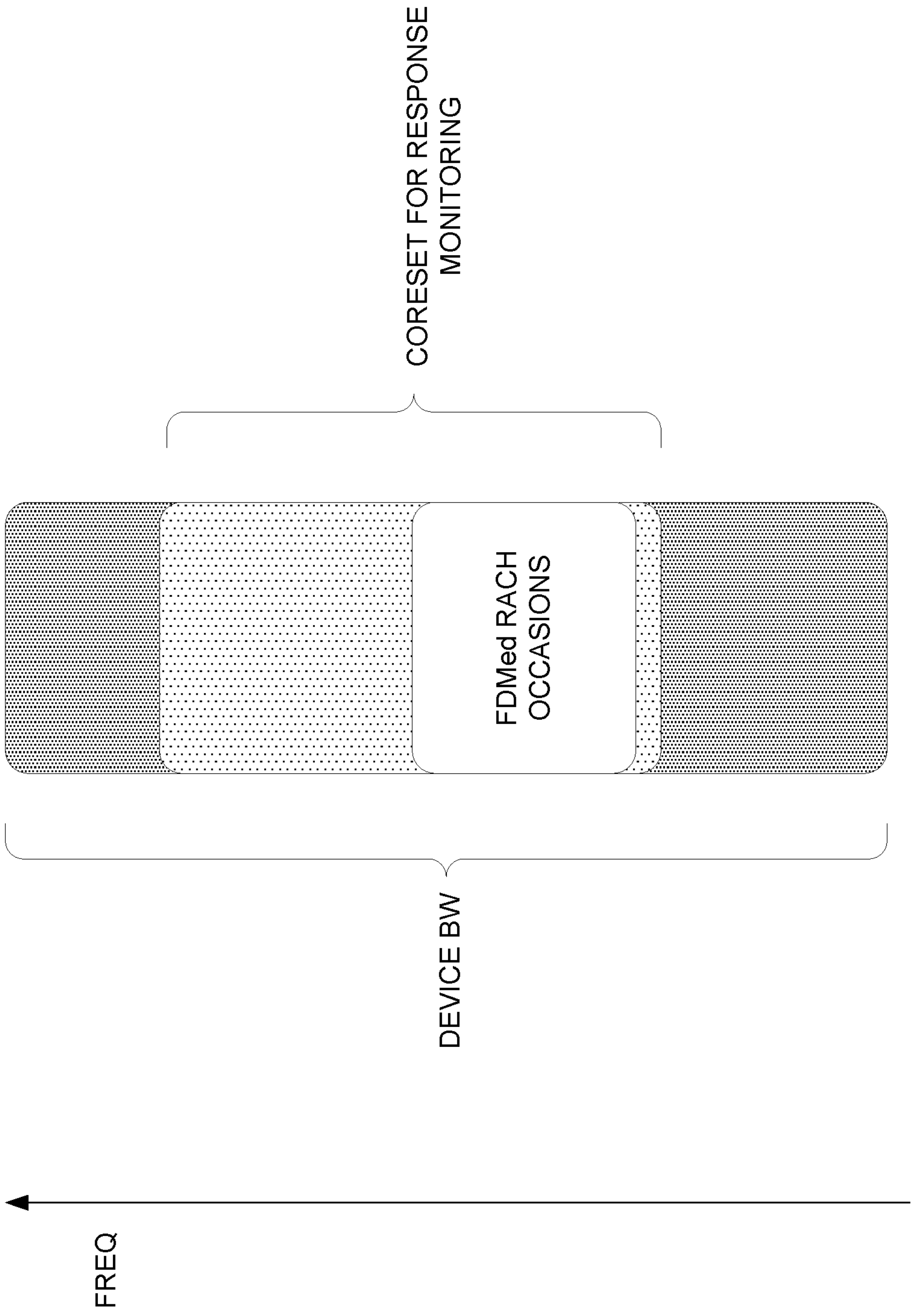
FIG. 13 is a block diagram of frequency multiplexed RACH occasions according to some embodiments.

In a related embodiment, the FDMed RACH occasions in the proper set 50S are based on the frequency location of the CORESET used for monitoring for a response to a random access preamble 14. One particular case where this is relevant is for unpaired spectrum, in which case the set of included FDMed RACH occasions may be selected as the ones located in a frequency range coinciding with the downlink frequency location of the CORESET used for response monitoring (as illustrated in FIG. 13).

Figure 14:
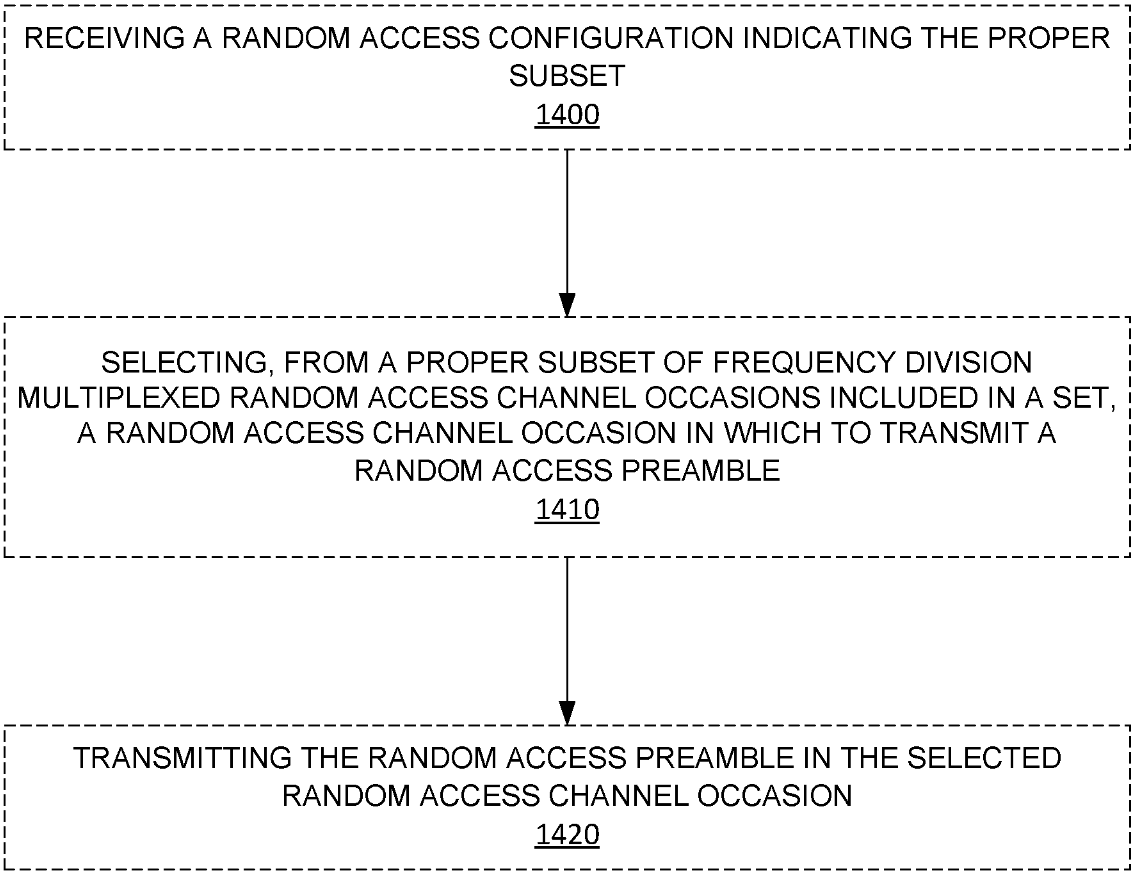
FIG. 14 is a logic flow diagram of a method performed by a wireless communication device according to yet other embodiments.

In view of the embodiments described in FIG. 12, FIG. 14 depicts a method performed by a wireless communication device 12 for random access to a wireless communication network 10 in accordance with particular embodiments. The method may include selecting, from a proper subset 50S of frequency division multiplexed random access channel occasions included in a set 50, a random access channel occasion in which to transmit a random access preamble 14 (Block 1410). The method may also include transmitting the random access preamble 14 in the selected random access channel occasion (Block 1420). Alternatively or additionally, the method may include receiving a random access configuration 60 indicating the proper subset 50S (Block 1400).

Additional aspects of one or more steps of the method in FIG. 14 are enumerated as Embodiments 1-12 in Group X Embodiments.

Figure 15:
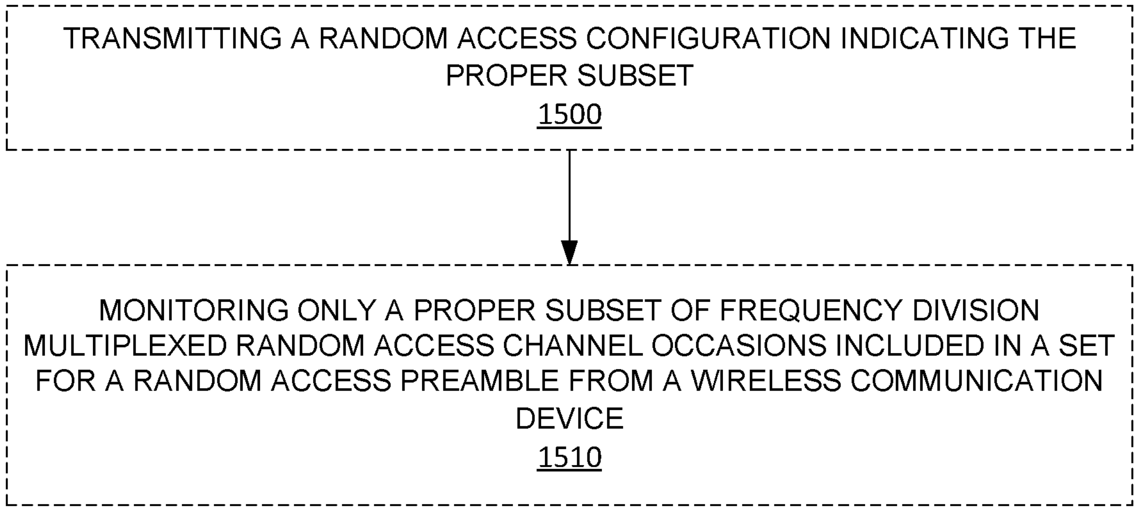
FIG. 15 is a logic flow diagram of a method performed by a radio network node according to yet other embodiments.

FIG. 15 depicts a corresponding method performed by a radio network node 16 of a wireless communication network 10 in accordance with other particular embodiments. The method may include monitoring only a proper subset 50S of frequency division multiplexed random access channel occasions included in a set 50 for a random access preamble 14 from a wireless communication device 12 (Block 1510).

The method in some embodiments may alternatively or additionally comprise transmitting a random access configuration 60 indicating the proper subset 50S (Block 1500).

Additional aspects of one or more steps of the method in FIG. 15 are enumerated as Embodiments 16-161 in Group Y Embodiments.

Note that any of the embodiments herein may be applied in any type of wireless communication network 10 which provides random access to the network 10. Some embodiments for example are applicable in a Long Term Evolution (LTE) network, a New Radio (NR) network, a 5G network, or other network specified by 3GPP.

Moreover, some embodiments herein may be applicable in any context in which a wireless communication network serves different types of wireless communication devices with different bandwidth capabilities. For example, the next paradigm shift in processing and manufacturing is the Industry 4.0 in which factories are automated and made much more flexible and dynamic with the help of wireless connectivity. This includes real-time control of robots and machines using time-critical machine-type communication (cMTC) and improved observability, control, and error detection with the help of large numbers of more simple actuators and sensors (massive machine-type communication or mMTC). For cMTC support, Ultra Reliance Low Latency Communications (URLLC) was introduced in 3GPP Release 15 for both LTE and NR, and NR URLLC is further enhanced in Release 16 within the enhanced URLLC (eURLLC) and Industrial Internet of Things (IoT) work items.

For mMTC and low power wide area (LPWA) support, 3GPP introduced both narrowband Internet-of-Things (NB-IoT) and long-term evolution for machine-type communication (LTE-MTC, or LTE-M) in Release 13. These technologies have been further enhanced through all releases up until and including the ongoing Release 16 work.

NR (New Radio) was introduced in 3GPP Release 15 and focused mainly on the enhanced mobile broadband (eMBB) and cMTC. However, there are still several other use cases whose requirements are higher than LPWAN (i.e., LTEM/NB-IoT) but lower than URLLC and eMBB. In order to efficiently support such use cases which are in-between eMBB, URLLC, and mMTC, the 3GPP has studied reduced capability NR devices (NR-RedCap) in Release 17. An NR-RedCap user equipment (UE), as one example of wireless communication device 12, is designed to have lower cost, lower complexity, a longer battery life, and enable a smaller form factor than legacy NR UEs. For RedCap UEs, different complexity reduction features including the reduced bandwidth and reduced number of antennas have been considered.

According to Release 15 and 16 NR specifications, a UE is required to support 100 MHz in frequency range 1 (FR1) and 200 MHz in frequency range 2 (FR2). These bandwidth requirements are considerably higher than what is needed from the data rate requirements of the RedCap use cases. Therefore, support for the following reduced maximum UE bandwidth features is desirable:

- Maximum bandwidth of an FR1 RedCap UE during and after initial access of 20 MHz. There may be the possibility of, and any associated conditions for, optional support of a wider bandwidth up to 40 MHz after initial access for this case.
- Maximum bandwidth of an FR2 RedCap UE during and after initial access is 100 MHz.

For support of UEs with different capabilities (e.g., bandwidth) in a network, some embodiments ensure an efficient coexistence of different UEs while considering resource utilization, network spectral/energy efficiency, and/or scheduling complexity. In this regard, some embodiments have the shared initial DL and UL bandwidth parts (BWPs) between different UEs particularly to avoid resource fragmentation and improve resource efficiency. For example, some embodiments support shared initial BWPs (which are used for initial access) between RedCap UEs and legacy UEs.

In some embodiments, the first step in initial access is that a UE detects the DL synchronization reference signals, including primary synchronization signal (PSS) and secondary synchronization signal (SSS). Following that, the UE reads the physical broadcast channel (PBCH) which includes master information block (MIB). Among other information, MIB contains PDCCH-ConfigSIB1, which is the configuration of CORESET0. After decoding CORESET0, which is the DL assignment for the remaining system information, the UE can receive the SIB1 including the random access channel (RACH) configuration.

Random access is the procedure for a UE accessing a cell, receiving a unique identification by the cell, and receiving the basic radio resource configurations. Random access as discussed herein may be accomplished via a random access procedure. In some embodiments, this procedure has 4 steps, whereas in other embodiments the procedure only has 2 steps.

The steps of four-step random access are as follows:

- Step 1: UE transmits a preamble referred to as Physical random access channel (PRACH), as one example of a random access preamble 14 herein.
- Step 2: The network sends a random access response (RAR), indicating reception of the preamble and a providing time-alignment command, where the RAR is one example of a response 20 herein.
- Step 3: The UE sends a Physical Uplink Control Channel (PUSCH) transmission, also referred to as Message 3, aiming at resolving collision.
- Step 4: The network sends a contention resolution message, also referred to as Message 4.

A two-step random access procedure may effectively condense the 4-step procedure into only 2 steps. Instead of the UE waiting to send the PUSCH (Message 3) until after receiving the RAR, the UE proactively transmits the PUSCH already at Step 1. Two-step random access may thereby be accomplished by the UE transmitting a so-called Message A that includes both the preamble and PUSCH, and by the network responding with a so-called Message B that includes the RAR and resolves any contention.

A random access preamble 14 as discussed herein may be of any type. In NR, for example, there are two types of preambles: long preambles and short preambles. These two preamble types are different in terms of the length of the preamble sequence (denoted by parameter L) as well as the subcarrier spacing used for the preamble transmission. The preamble type is part of the cell-specific random-access configuration, meaning that within a cell only one type of preamble can be used during initial access. For long preambles the sequence length is L=839 and subcarrier spacing can be 1.25 kHz or 5 kHz, which is different from subcarrier spacing used for any other NR transmissions. In NR, long preambles can only be used in FR1 for frequency bands below 6 GHz. For short preambles, the sequence length is L=139 with a subcarrier spacing used for typical NR transmissions (i.e., 15 kHz and 30 kHz in FR1, 60 kHz and 120 kHz in FR2).

After a device sends a preamble, it monitors the control channels for a random-access response within a configurable time window known as RAR window. The UE performs the monitoring by attempting to detect a PDCCH transmission with a Cyclic Redundancy Check, CRC, scrambled with a Random Access Radio Temporary Network Identifier, RA-RNTI. In case the device does not detect a random-access response within this time window, it needs to retransmit the preamble with a higher power. In some embodiments, the length of the window in number of slots, based on the SCS for Type1-PDCCH CSS set, is provided by ra-Response-Window. In some embodiments, the RAR window size can be {1, 2, 4, 8, 10, 20, 40, 80} slots with a maximum length of 10 ms. The length of one slot depends on the RAR numerology which is indicated in system information, and may vary from ⅛ ms for 120 kHz subcarrier spacing to 1 ms for 15 kHz subcarrier spacing. This RAR window as discussed above is one example of a response window 24 herein.

In some embodiments, msg1-FDM is the information element in the RACH configuration for the number of FDMed RACH occasions. The terms 'PRACH occasion' and 'RACH occasion' are used interchangeably in the standard and also herein.

Note that the discussion herein has primarily concerned the frequency location of the RACH occasions, but embodiments herein equally apply to the situation where the RACH occasions are multiplexed both in frequency and in time.

Some embodiments address certain challenges in the above context. In particular, the initial bandwidth part (BWP) may be configured up to the entire carrier bandwidth in some embodiments. Sharing the initial UL BWP between different UEs with different BW capabilities can pose challenges related to the random access procedure. Heretofore, the number of frequency division multiplexed (FDMed) RACH occasions can be up to 8. In general, RACH occasions and CORESET for receiving RAR (e.g., CORESET #0) are within the initial bandwidth part (BWP). Also, the CORESET for receiving RAR is within the CORESET #0 bandwidth (could also be CORESET #0 itself). The location of CORESET #0 depends on the location of synchronization signal block (SSB) (e.g., related by some offset in frequency). Depending on the RACH configurations, bandwidth reduction has a potential impact on the random access procedure. For example, when RACH occasions are frequency multiplexed, the total frequency span of 8 RACH occasions is greater than 20 MHz in FR1 and 100 MHz in FR2 (e.g., bandwidth of RedCap UEs) in the following configurations:

FR1, L=839, 5 kHz SCS: total BW of 8 RACH occasions=8*4.32 MHz=34.56 MHz

FR2, L=139, 120 kHz SCS: total BW of 8 RACH occasions=8*17.28 MHz=138.24 MHz

For normal UEs, the initial BWP is within the UE bandwidth. However, for reduced-BW UEs, if the initial BWP is shared with normal UEs, the initial BWP may exceed the bandwidth of reduced-BW UEs. Therefore, for reduced bandwidth UEs, the RACH occasion(s) associated with the best/preferred SSB beam may fall outside of their RF bandwidths. Accordingly, for reduced bandwidth UEs, there is a need for solutions to ensure that a RACH occasion associated with the best SSB falls within the UE bandwidth and the random-access procedure can be completed.

To address this, some embodiments enable the support of a random access procedure for reduced bandwidth UEs in coexistence with regular UEs in a network. Some embodiments enable this support via proper RF retuning, e.g., as exemplified in FIGS. 1-3 and 6. Other embodiments enable this support via a new RACH configuration, e.g., as exemplified in FIGS. 9-12. In the RF retuning embodiments, where the UE retunes its center frequency to detect its desired RACH occasion, a delay parameter may be introduced for the start of the RAR window (or the start of a RAR within the RAR window) to accommodate for the RF retuning delay. In the new RACH configuration embodiments, one or more new numbers of frequency multiplexed RACH occasions are introduced, e.g., based on the UE bandwidth and capacity requirements. Some embodiments thereby support a random access procedure for reduced bandwidth UEs by: (1) introducing a delay parameter for starting the RAR window (or for transmitting the RAR within the window) when performing RF retuning during random access, and/or 2) introducing new PRACH configurations suitable for reduced bandwidth UEs.

Certain embodiments may provide one or more of the following technical advantage(s). Some embodiments enable the support of a random access procedure for reduced bandwidth UEs in coexistence with regular UEs in a network. In particular, some embodiments ensure that a RACH occasion associated with the best SSB falls within the UE bandwidth and the random-access procedure can be completed. Some embodiments can be beneficial for: 1) efficient support of UEs with different capabilities in a network, and/or 2) resource utilization, avoiding resource fragmentation, scheduling flexibility, and/or network capacity.

Different embodiments described herein can be combined wherever applicable, and such combinations are included within the present disclosure. This may refer to different embodiments within the descriptions of RF retuning or new PRACH configurations, respectively, but it may also refer to embodiments described in different sections.

Furthermore, some embodiments are described in terms of a functionality for one node, such as a gNB or a UE, but there is then a corresponding embodiment also for the counterpart node. Such corresponding embodiments are included within the present disclosure. For example, an embodiment describing a UE transmitting a signal or channel—such as a PRACH preamble—has a corresponding action in a gNB embodiment of receiving the signal or channel. Similarly, an embodiment describing a UE receiving a signal, channel, or configuration—such as a Random Access Response—has a corresponding action in a gNB embodiment of transmitting the signal, channel, or configuration.

Embodiments herein also include corresponding apparatuses. Embodiments herein for instance include a wireless communication device 12 configured to perform any of the steps of any of the embodiments described above for the wireless communication device 12.

Embodiments also include a wireless communication device 12 comprising processing circuitry and power supply circuitry. The processing circuitry is configured to perform any of the steps of any of the embodiments described above for the wireless communication device 12. The power supply circuitry is configured to supply power to the wireless communication device 12.

Embodiments further include a wireless communication device 12 comprising processing circuitry. The processing circuitry is configured to perform any of the steps of any of the embodiments described above for the wireless communication device 12. In some embodiments, the wireless communication device 12 further comprises communication circuitry.

Embodiments further include a wireless communication device 12 comprising processing circuitry and memory. The memory contains instructions executable by the processing circuitry whereby the wireless communication device 12 is configured to perform any of the steps of any of the embodiments described above for the wireless communication device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless communication device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 16 configured to perform any of the steps of any of the embodiments described above for the radio network node 16.

Embodiments also include a radio network node 16 comprising processing circuitry and power supply circuitry. The processing circuitry is configured to perform any of the steps of any of the embodiments described above for the radio network node 16. The power supply circuitry is configured to supply power to the radio network node 16.

Embodiments further include a radio network node 16 comprising processing circuitry. The processing circuitry is configured to perform any of the steps of any of the embodiments described above for the radio network node 16. In some embodiments, the radio network node 16 further comprises communication circuitry.

Embodiments further include a radio network node 16 comprising processing circuitry and memory. The memory contains instructions executable by the processing circuitry whereby the radio network node 16 is configured to perform any of the steps of any of the embodiments described above for the radio network node 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 16:
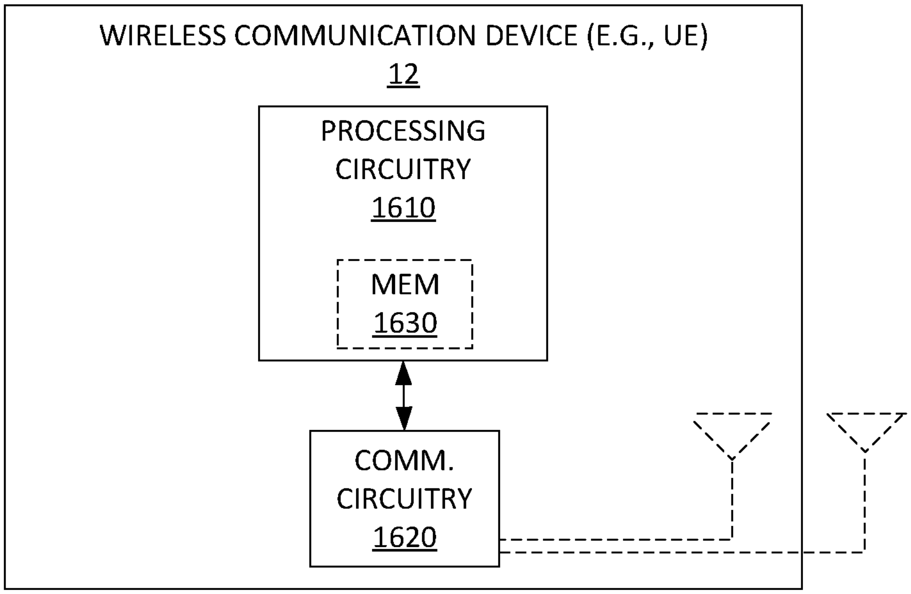
FIG. 16 is a block diagram of a wireless communication device according to some embodiments.

FIG. 16 for example illustrates a wireless communication device 12 as implemented in accordance with one or more embodiments. As shown, the wireless communication device 12 includes processing circuitry 1610 and communication circuitry 1620. The communication circuitry 1620 (e.g., radio circuitry) is configured to transmit and/or receive information to and/or from one or more other nodes, e.g., via any communication technology. Such communication may occur via one or more antennas that are either internal or external to the wireless communication device 12. The processing circuitry 1610 is configured to perform processing described above, e.g., in FIG. 4 or 7, such as by executing instructions stored in memory 1630. The processing circuitry 1610 in this regard may implement certain functional means, units, or modules.

Figure 17:
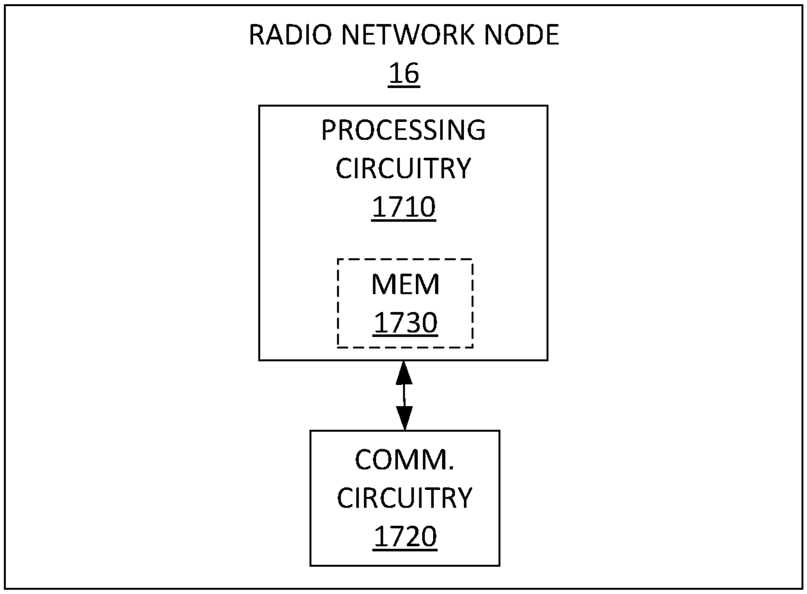
FIG. 17 is a block diagram of a radio network node according to some embodiments.

FIG. 17 illustrates a radio network node 16 as implemented in accordance with one or more embodiments. As shown, the radio network node 16 includes processing circuitry 1710 and communication circuitry 1720. The communication circuitry 1720 is configured to transmit and/or receive information to and/or from one or more other nodes, e.g., via any communication technology. The processing circuitry 1710 is configured to perform processing described above, e.g., in FIG. 5 or 8, such as by executing instructions stored in memory 1730. The processing circuitry 1710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 18:
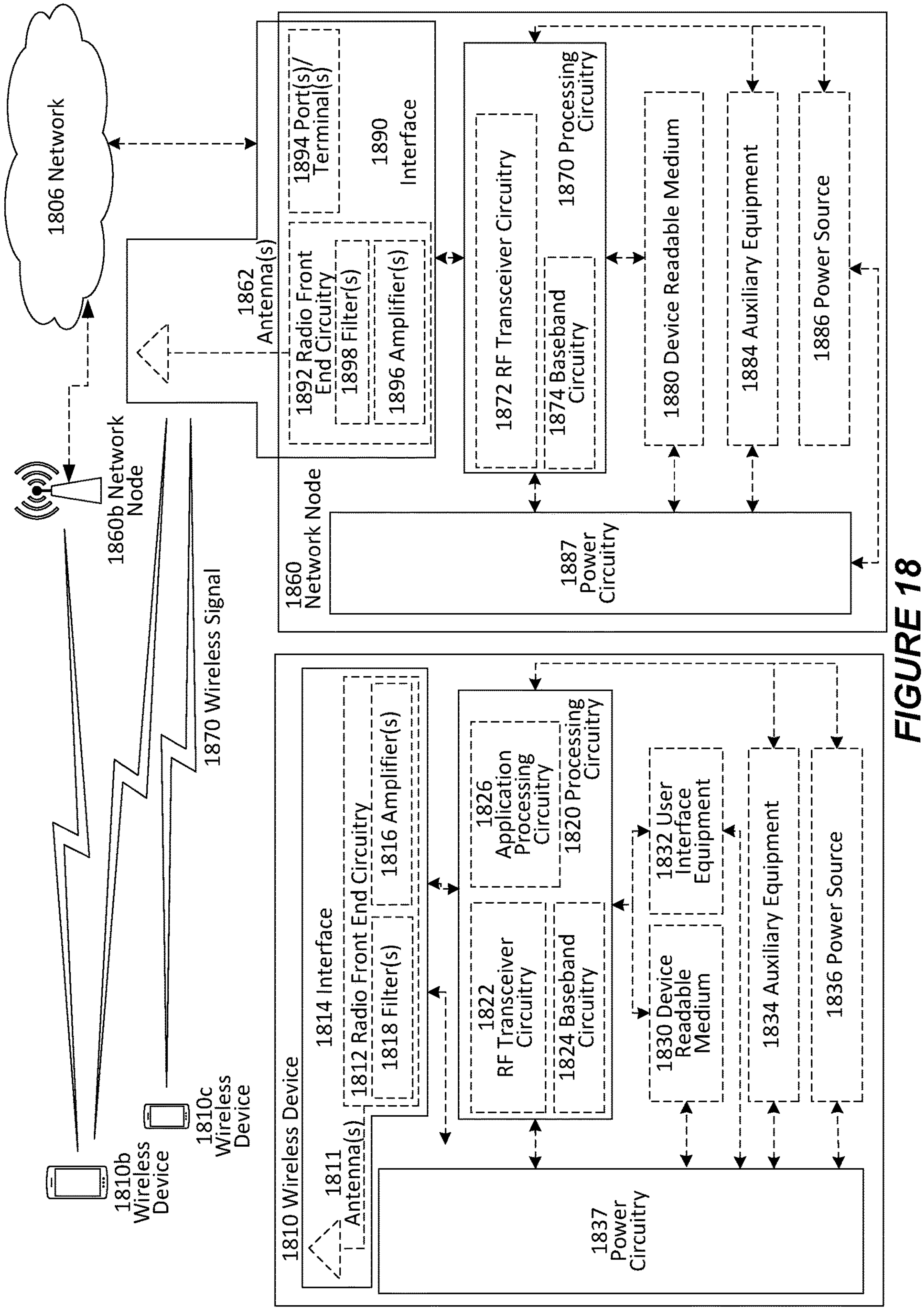
FIG. 18 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 1806, network nodes 1860 and 1860*b*, and WDs 1810, 1810*b*, and 1810*c*. In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signalling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 18 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 19:
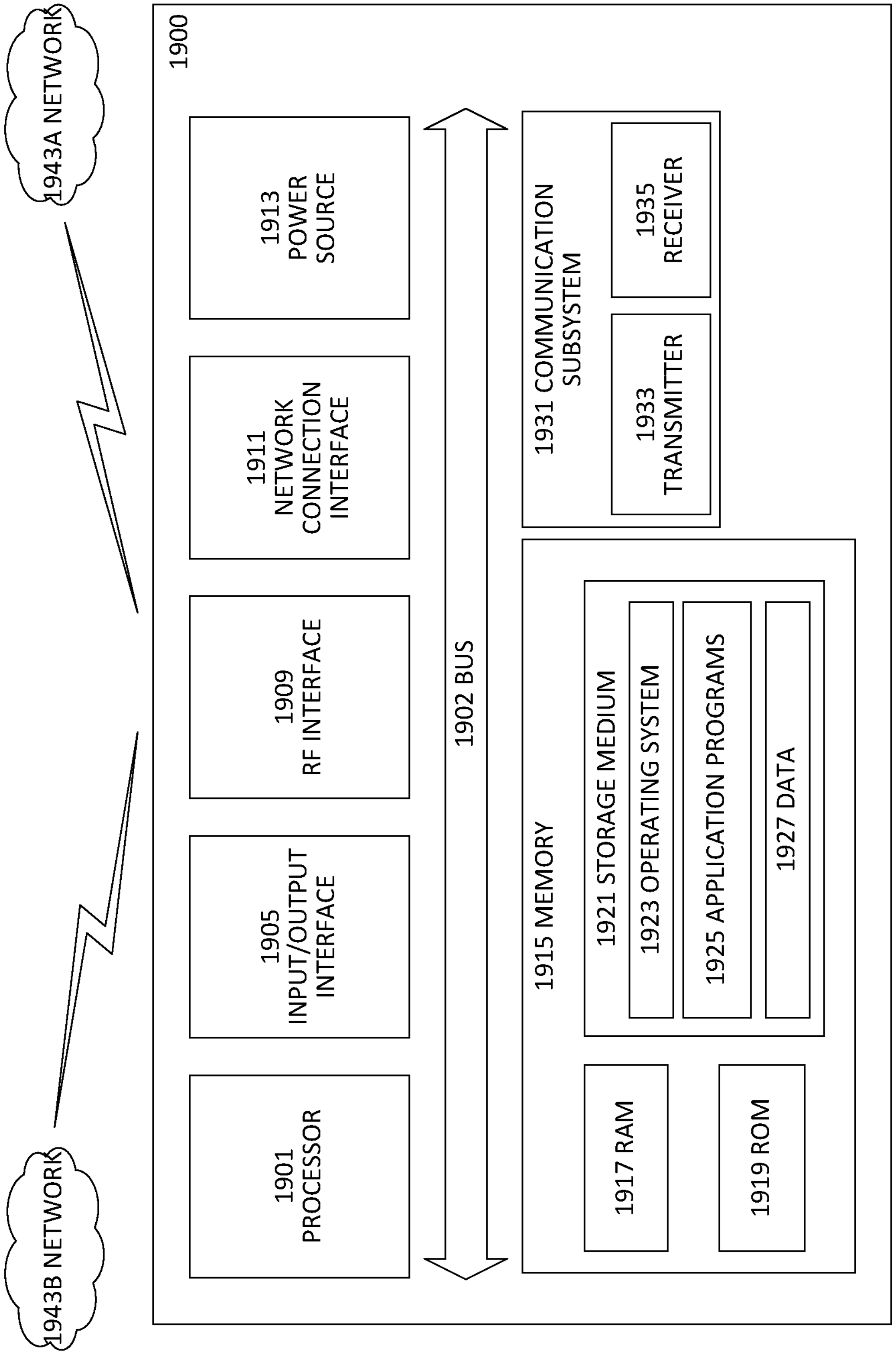
FIG. 19 is a block diagram of a user equipment according to some embodiments.

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1900 may be any UE identified by the 3$^{rd}$ Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable interchangeably. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1913, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network **1943*a*. Network 1943*a* may encompass wired and/or wireless networks such as a local-area network (LAN), a wide-area network (WAN), a computer network, a wireless network, a telecommunications network, another like network or any combination thereof. For example, network 1943*a* may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911** may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processing circuitry 1901 may be configured to communicate with network 1943*b* using communication subsystem 1931. Network 1943*a* and network 1943*b* may be the same network or networks or different network or networks. Communication subsystem 1931 may be configured to include one or more transceivers used to communicate with network 1943*b*. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943*b* may encompass wired and/or wireless networks such as a local-area network (LAN), a wide-area network (WAN), a computer network, a wireless network, a telecommunications network, another like network or any combination thereof. For example, network 1943*b* may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
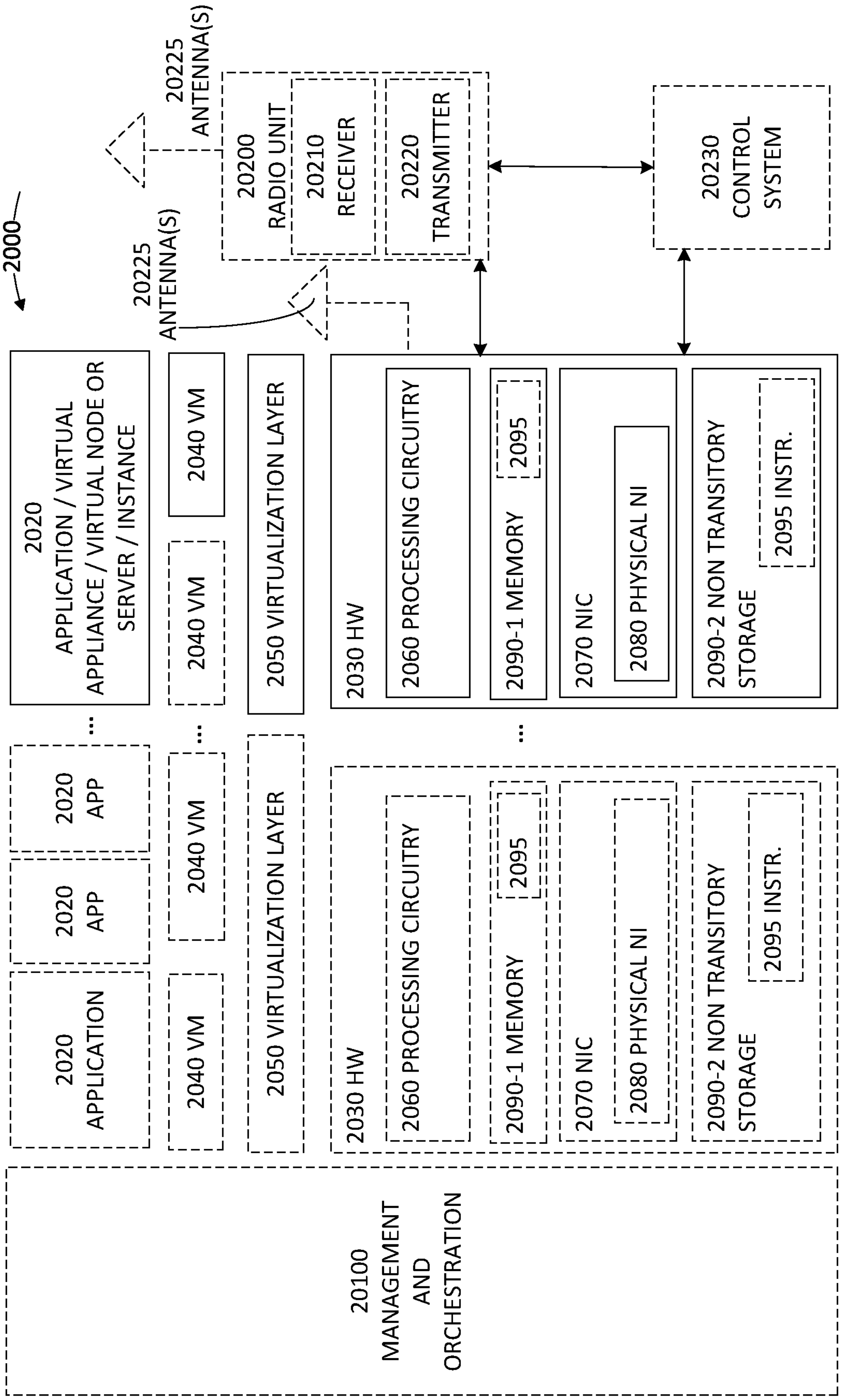
FIG. 20 is a block diagram of a virtualization environment according to some embodiments.

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g. such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signalling can be effected with the use of control system 20230 which may alternatively be used for communication between the hardware nodes 2030 and radio units 20200.

Figure 21:
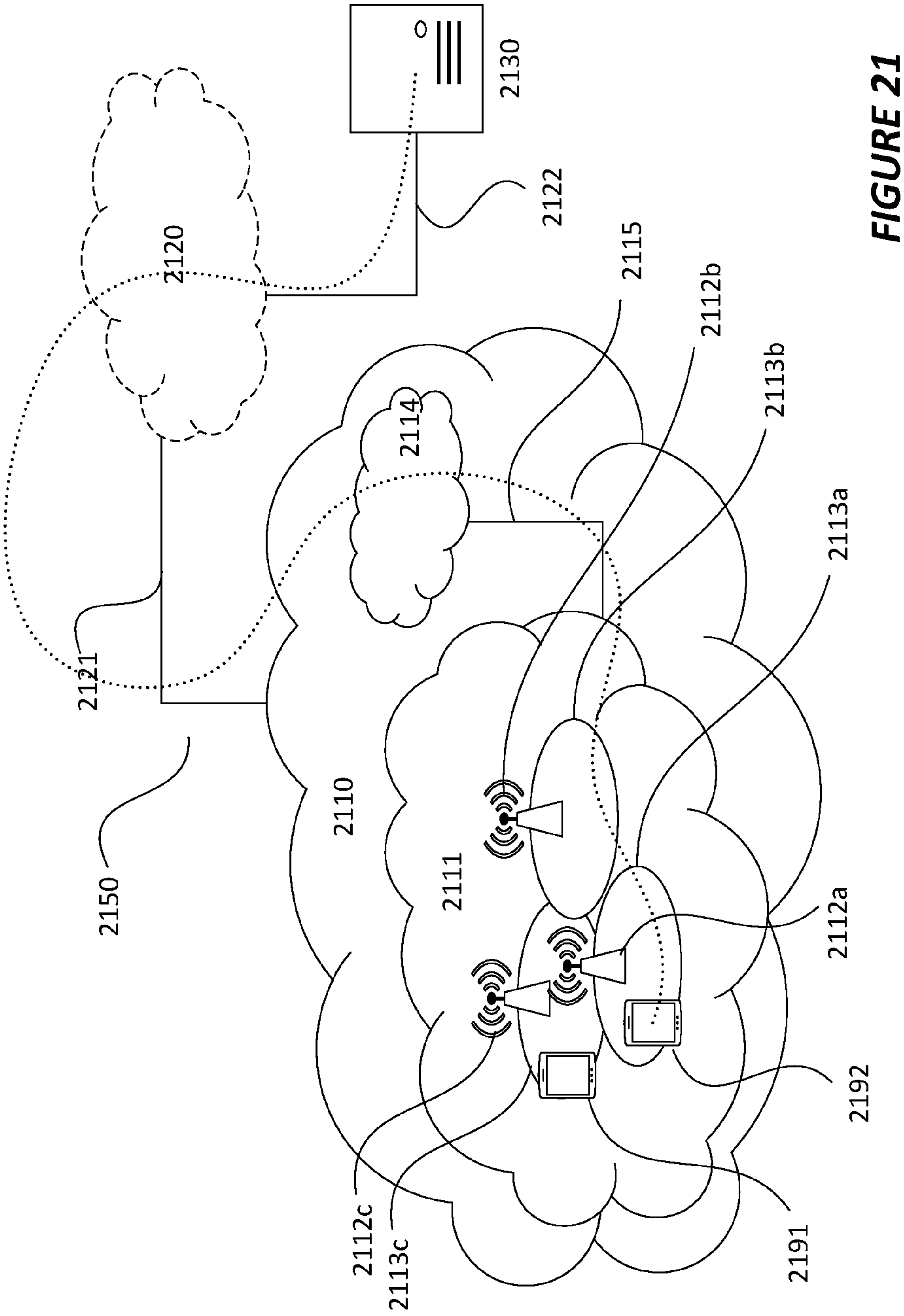
FIG. 21 is a block diagram of a communication network with a host computer according to some embodiments.

FIG. 21 illustrates a telecommunication network connected via an intermediate network to a host computer in accordance with some embodiments. In particular, with reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112*a*, 2112*b*, 2112*c*, such as NBs, eNBs, gNBs or other types of wireless access points, each defining a corresponding coverage area 2113*a*, 2113*b*, 2113*c*. Each base station 2112*a*, 2112*b*, 2112*c* is connectable to core network 2114 over a wired or wireless connection 2115. A first UE 2191 located in coverage area 2113*c* is configured to wirelessly connect to, or be paged by, the corresponding base station 2112*c*. A second UE 2192 in coverage area 2113*a* is wirelessly connectable to the corresponding base station 2112*a*. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Figure 22:
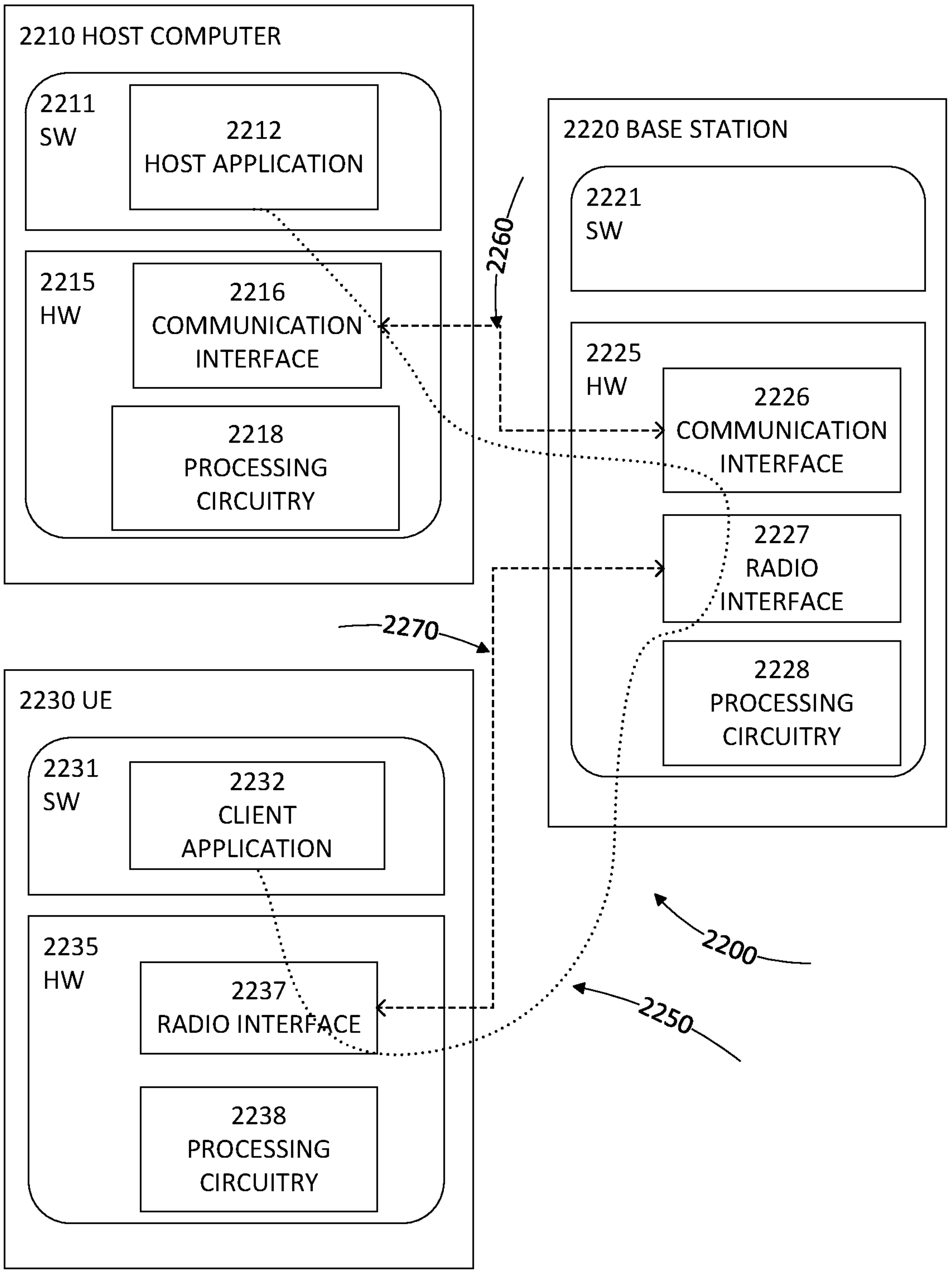
FIG. 22 is a block diagram of a host computer according to some embodiments.

Example implementations, in accordance with an embodiment, of the UE, base station and host computer discussed in the preceding paragraphs will now be described with reference to FIG. 22. FIG. 22 illustrates host computer communicating via a base station with a user equipment over a partially wireless connection in accordance with some embodiments In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

It is noted that host computer 2210, base station 2220 and UE 2230 illustrated in FIG. 22 may be similar or identical to host computer 2130, one of base stations 2112*a*, 2112*b*, 2112*c* and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
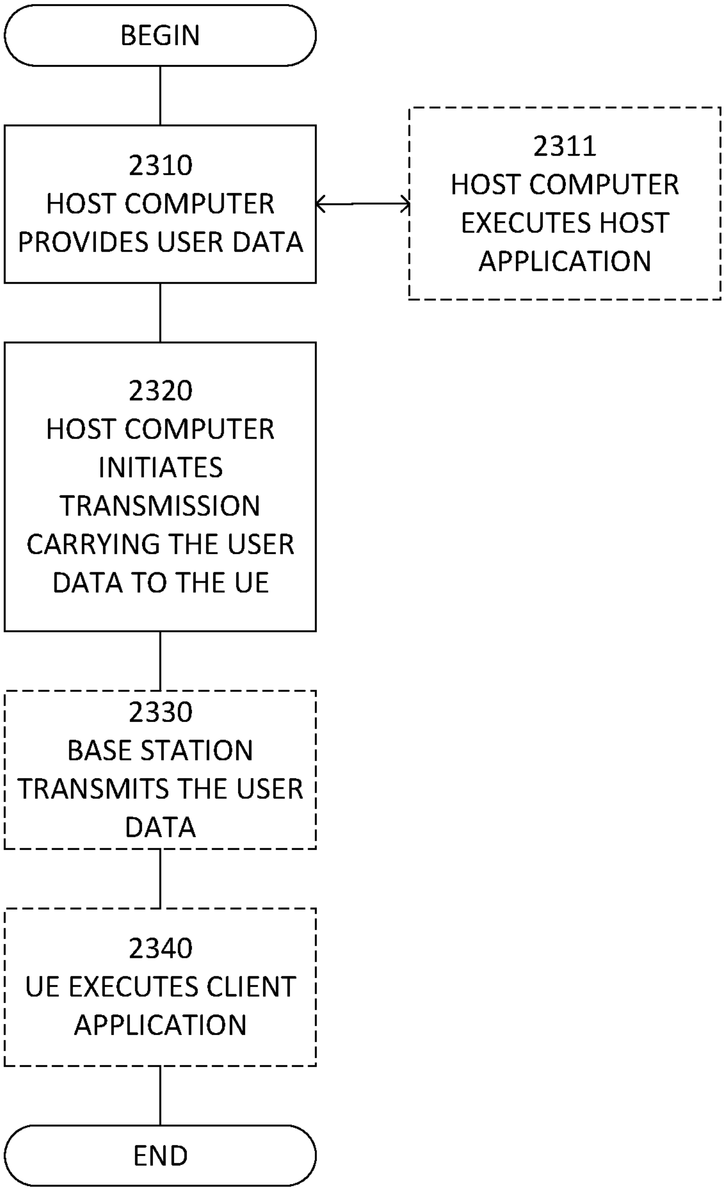
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
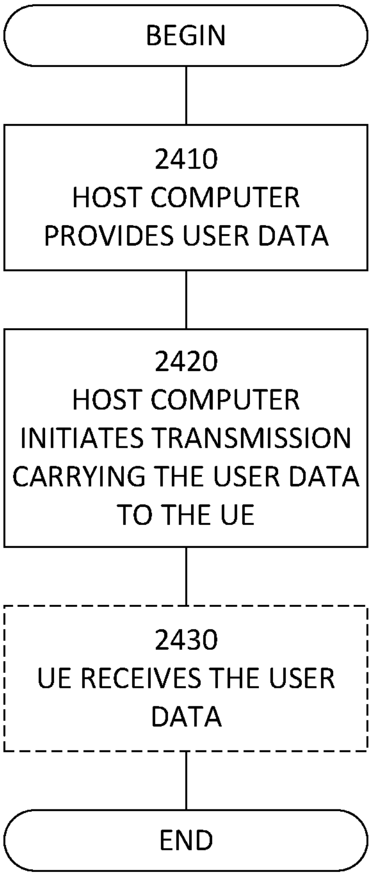
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

Figure 25:
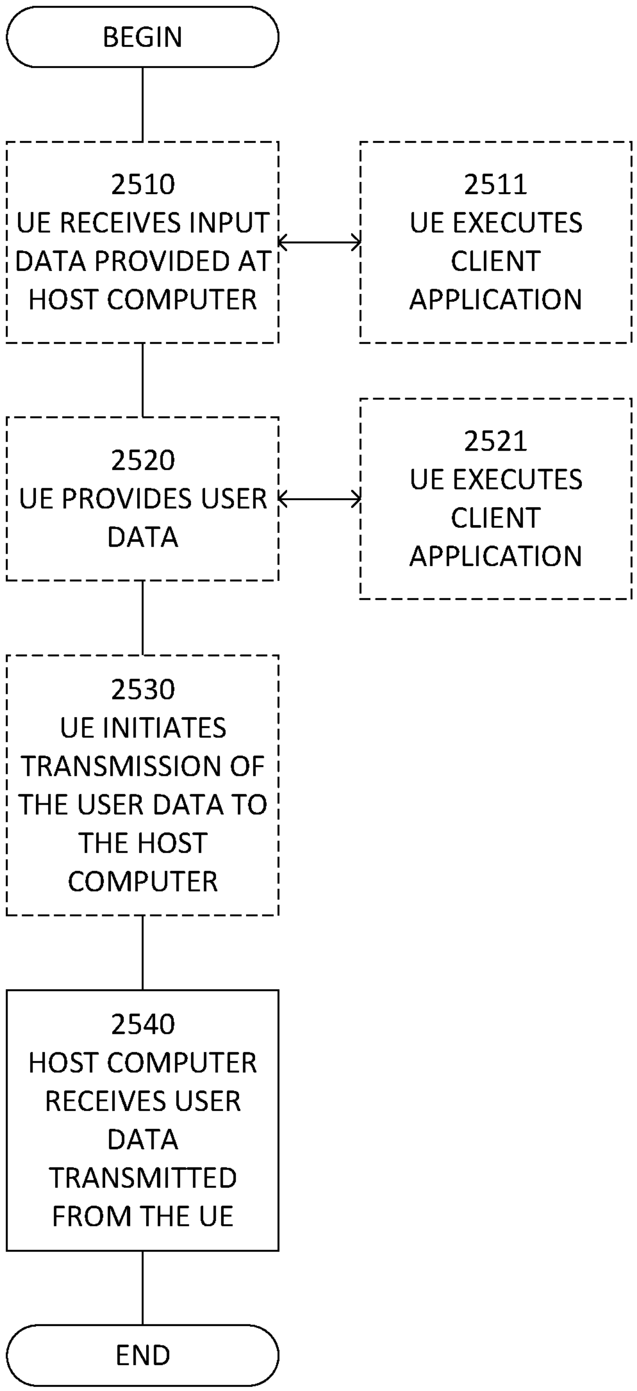
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer. In step 2540 of the method, the host computer receives the user data transmitted from the UE, in accordance with the teachings of the embodiments described throughout this disclosure.

Figure 26:
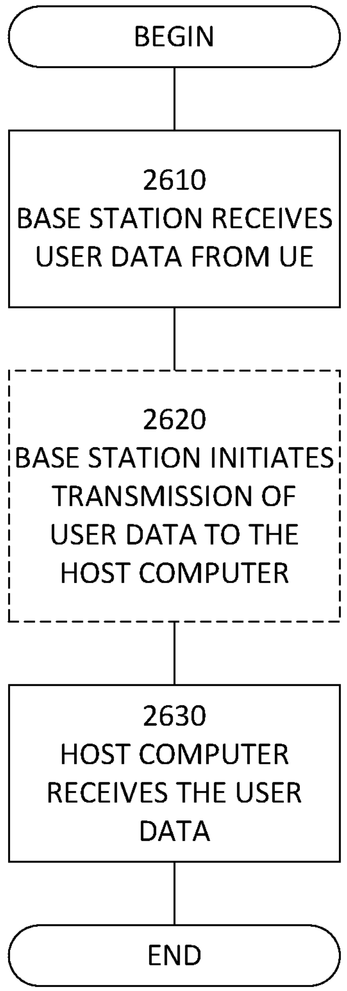
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 2610 (which may be optional), in accordance with the teachings of the embodiments described throughout this disclosure, the base station receives user data from the UE. In step 2620 (which may be optional), the base station initiates transmission of the received user data to the host computer. In step 2630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by a wireless communication device (12) for random access to a wireless communication network (10), the method comprising:
transmitting (410), to the wireless communication network, a random access preamble (14) in a random access channel occasion (18) that comprises one or more symbols; and
monitoring (420) for a response (20) to the random access preamble within a response window (24), wherein the response window starts in an earliest control resource set (22-2) that begins at least a minimum number (Dmin) of symbols after the last symbol (18L) of the random access channel occasion, wherein the minimum number of symbols is greater than one.

A2. The method of embodiment A1, further comprising, after transmitting the random access preamble at a transmit frequency, re-tuning a receiver (12R) of the wireless communication device to monitor for the response at a receive frequency.

A3. The method of embodiment A2, wherein the random access preamble is transmitted using a transmitter (12T) of the wireless communication device, wherein re-tuning the receiver comprises re-tuning an oscillator (12L) shared between the transmitter and the receiver.

A4. The method of any of embodiments A1-A3, wherein one or more control resource sets (22-1) each begin at least one symbol after the last symbol of the random access channel occasion but begin fewer than said minimum number of symbols after the last symbol of the random access channel occasion.

A5. The method of embodiment A4, wherein said earliest control resource set, and each of the one or more control resource sets, is a control resource set that the wireless communication device is configured to receive a Physical Downlink Control Channel, PDCCH, for a Type1-PDCCH common search space, CSS, set.

A6. The method of any of embodiments A4-A5, comprising waiting to monitor for the response until the start of the response window, wherein said waiting comprises refraining from monitoring for the response during said one or more control resource sets.

A7. The method of any of embodiments A1-A6, wherein the wireless communication device is a half-duplex frequency division duplex, FDD, device or is operating as a time division duplex, TDD, device.

A8. The method of any of embodiments A1-A7, further comprising selecting the random access channel occasion, in which to transmit the random access preamble, from a set of random access channel occasions (18-1 . . . 18-N) that are frequency multiplexed across a frequency bandwidth wider than a transmit bandwidth of the wireless communication device.

A9. The method of any of embodiments A1-A8, wherein the random access channel occasion is included in a set of random access channel occasions that are frequency multiplexed across a frequency bandwidth wider than a transmit bandwidth of the wireless communication device.

A10. The method of any of embodiments A1-A9, further comprising, before the start of the response window, transmitting an indication of a transmit bandwidth of the wireless communication device and/or a receive bandwidth of the wireless communication device.

A11. The method of embodiment A10, wherein transmitting the random access preamble comprises transmitting a message that includes the random access preamble, wherein the indication is included in the message.

A12. The method of any of embodiments A1-A11, further comprising selecting, based on a transmit bandwidth of the wireless communication device, at least one of any one or more of:
the random access preamble to transmit;
a sequence associated with the random access preamble to transmit;
a format of the random access preamble to transmit;
a length of the random access preamble to transmit; and
a time and/or frequency resource for the random access channel occasion in which the random access preamble is to be transmitted.

A13. The method of any of embodiments A1-A11, further comprising receiving (400), from the wireless communication network, a random access configuration (30) indicating the minimum number of symbols.

A14. The method of embodiment A13, wherein the random access configuration is included in system information broadcast from the wireless communication network.

A15. The method of embodiment A13, wherein the random access configuration is received in dedicated Radio Resource Control, RRC, signaling.

A16. The method of any of embodiments A13-A15, wherein the random access configuration is received from a first cell or on a first carrier, first band, or first frequency, wherein the random access configuration is applicable for random access to a second cell or on a second carrier, second band, or second frequency.

A17. The method of any of embodiments A1-A16, wherein the minimum number of symbols is 2, 3, 6, 12, or 24.

A18. The method of any of embodiments A1-A17, further comprising determining the minimum number of symbols based on a radio frequency re-tuning time of the wireless communication device, and/or a subcarrier spacing for the response, and/or a length of the response window, and/or a frequency location of the earliest control resource set.

A19. The method of any of embodiments A1-A18, further comprising determining the minimum number of symbols as a function of $\lceil R/S \rceil$, where R is a radio frequency re-tuning time of the wireless communication device, S is a subcarrier spacing for the response, and $\lceil\ \rceil$ is a ceiling function.

A20. The method of any of embodiments A1-A19, wherein a reference control resource set is an earliest control resource set that begins at least one symbol after the last symbol of the random access channel occasion, wherein the reference control resource set starts x symbols after the last symbol of the random access channel occasion, and wherein the method further comprising determining the minimum number of symbols as a function of $$\left\lceil \frac{R}{S} \right\rceil - x,$$

where R is a radio frequency re-tuning time of the wireless communication device, S is a subcarrier spacing for the response, and ⌈ ⌉ is a ceiling function.

A21. The method of any of embodiments A1-A20, further comprising determining the minimum number of symbols as a function of:

whether the wireless communication device is operating as a full-duplex device or a half-duplex device;

whether the wireless communication device is operating as a half-duplex Type A device or a half-duplex Type B device; and/or whether the wireless communication device is operating as a frequency-division duplex device or a time-division duplex device.

A22. The method of any of embodiments A1-A21, further comprising determining the minimum number of symbols as a function of a transmit frequency at which the wireless communication device transmits the random access preamble and/or a receive frequency at which the wireless communication device monitors for the response.

A23. The method of any of embodiments A1-A22, further comprising determining the minimum number of symbols as a function of a transmit bandwidth of the wireless communication device.

A24. The method of any of embodiments A1-A23, wherein the response window starts at a first symbol of said earliest control resource set.

A25. The method of any of embodiments A1-A24, wherein said earliest control resource set is an earliest control resource set:

that the wireless communication device is configured to receive a Physical Downlink Control Channel, PDCCH, for a Type1-PDCCH common search space, CSS, set; and that begins at least said minimum number of symbols after the last symbol of the random access channel occasion.

AA1. A method performed by a wireless communication device (12), the method comprising:

receiving (400) a random access configuration (30) that configures a response window (24) to be monitored for a response (20) to a random access preamble (14) transmitted in a random access channel occasion (18), wherein the random access configuration configures the response window to start in an earliest control resource set (22-2) that begins at least a minimum number (Dmin) of symbols after the last symbol (18L) of the random access channel occasion, wherein the minimum number of symbols is greater than one.

AA2. The method of embodiment AA1, further comprising, after transmitting the random access preamble at a transmit frequency, re-tuning a receiver (12R) of the wireless communication device to monitor for the response at a receive frequency different than the transmit frequency.

AA3. The method of embodiment AA2, wherein the random access preamble is transmitted using a transmitter (12T) of the wireless communication device, wherein re-tuning the receiver comprises re-tuning an oscillator (12L) shared between the transmitter and the receiver.

AA4. The method of any of embodiments AA1-AA3, wherein one or more control resource sets (22-1) each begin at least one symbol after the last symbol of the random access channel occasion but begin fewer than said minimum number of symbols after the last symbol of the random access channel occasion.

AA5. The method of embodiment AA4, wherein said earliest control resource set, and each of the one or more control resource sets, is a control resource set that the wireless communication device is configured to receive a Physical Downlink Control Channel, PDCCH, for a Type1-PDCCH common search space, CSS, set.

AA6. The method of any of embodiments AA4-AA5, further comprising waiting to monitor for the response until the start of the response window, wherein said waiting comprises refraining from monitoring for the response during said one or more control resource sets.

AA7. The method of any of embodiments AA1-AA6, wherein the wireless communication device is operating as a half-duplex device and/or is operating as a time division duplex, TDD, device.

AA8. The method of any of embodiments AA1-AA7, further comprising selecting the random access channel occasion, in which to transmit the random access preamble, from a set of random access channel occasions that are frequency multiplexed across a frequency bandwidth wider than a transmit bandwidth of the wireless communication device.

AA9. The method of any of embodiments AA1-AA8, wherein the random access channel occasion is included in a set of random access channel occasions that are frequency multiplexed across a frequency bandwidth wider than a transmit bandwidth of the wireless communication device.

AA10. The method of any of embodiments AA1-AA9, further comprising, before the start of the response window, transmitting an indication of a transmit bandwidth of the wireless communication device and/or a receive bandwidth of the wireless communication device.

AA11. The method of embodiment AA10, further comprising transmitting a message that includes the random access preamble, wherein the indication is included in the message.

AA12. The method of any of embodiments AA1-AA11, further comprising selecting, based on a transmit bandwidth of the wireless communication device, at least one of any one or more of:

the random access preamble to transmit;

a sequence associated with the random access preamble to transmit;

a format of the random access preamble to transmit;

a length of the random access preamble to transmit; and a time and/or frequency resource for the random access channel occasion in which the random access preamble is to be transmitted.

AA13. The method of any of embodiments AA1-AA11, wherein the random access configuration indicates the minimum number of symbols.

AA14. The method of embodiment AA13, wherein the random access configuration is included in system information broadcast from the wireless communication network.

AA15. The method of embodiment AA13, wherein the random access configuration is received in dedicated Radio Resource Control, RRC, signaling.

AA16. The method of any of embodiments A, wherein the random access configuration is received from a first cell or on a first carrier, first band, or first frequency, wherein the random access configuration is applicable for random access to a second cell or on a second carrier, second band, or second frequency.

AA17. The method of any of embodiments AA1-AA16, wherein the minimum number of symbols is 2, 3, 6, 12, or 24.

AA18. The method of any of embodiments AA1-AA17, wherein the random access configuration indicates the minimum number of symbols as a function of a radio frequency re-tuning time of the wireless communication device, and/or a subcarrier spacing for the response, and/or a length of the response window, and/or a frequency location of the earliest control resource set.

AA19. The method of any of embodiments AA1-AA18, wherein the random access configuration indicates the minimum number of symbols as a function of $\lceil R/S \rceil$, where R is a radio frequency re-tuning time of the wireless communication device, S is a subcarrier spacing for the response, and $\lceil\ \rceil$ is a ceiling function.

AA20. The method of any of embodiments AA1-AA19, wherein a reference control resource set is an earliest control resource set that begins at least one symbol after the last symbol of the random access channel occasion, wherein the reference control resource set starts x symbols after the last symbol of the random access channel occasion, and wherein the random access configuration indicates the minimum number of symbols as a function of $$\left\lceil \frac{R}{S} \right\rceil - x,$$

where R is a radio frequency re-tuning time of the wireless communication device, S is a subcarrier spacing for the response, and $\lceil\ \rceil$ is a ceiling function.

AA21. The method of any of embodiments AA1-AA20, wherein the random access configuration indicates the minimum number of symbols as a function of:

whether the wireless communication device is operating as a full-duplex device or a half-duplex device;

whether the wireless communication device is operating as a half-duplex Type A device or a half-duplex Type B device; and/or whether the wireless communication device is operating as a frequency-division duplex device or a time-division duplex device.

AA22. The method of any of embodiments AA1-AA21, wherein the random access configuration indicates the minimum number of symbols as a function of a transmit frequency at which the wireless communication device transmits the random access preamble and/or a receive frequency at which the wireless communication device monitors for the response.

AA23. The method of any of embodiments AA1-AA22, wherein the random access configuration indicates the minimum number of symbols as a function of a transmit bandwidth of the wireless communication device.

AA24. The method of any of embodiments AA1-AA23, wherein the response window starts at a first symbol of said earliest control resource set.

AA25. The method of any of embodiments AA1-AA24, wherein said earliest control resource set is an earliest control resource set:

that the wireless communication device is configured to receive a Physical Downlink Control Channel, PDCCH, for a Type1-PDCCH common search space, CSS, set; and that begins at least said minimum number of symbols after the last symbol of the random access channel occasion.

AAA1. A method performed by a wireless communication device (12) for random access to a wireless communication network (10), the method comprising:

transmitting (710), to the wireless communication network, a random access preamble (14) in a random access channel occasion (18); and monitoring (720) for a response (20) to the random access preamble during only a portion (32B) of a response window (32) that corresponds to the random access channel occasion.

AAA2. The method of embodiment AAA1, wherein the portion of the response window begins a certain number of symbols after a start of the response window.

AAA3. The method of any of embodiments AAA1-AAA2, comprising waiting to monitor for the response until a beginning of the portion of the response window.

AAA4. The method of any of embodiments AAA1-AAA3, further comprising, after transmitting the random access preamble at a transmit frequency, re-tuning a receiver of the wireless communication device to monitor for the response at a receive frequency different than the transmit frequency.

AAA5. The method of embodiment AAA4, wherein the random access preamble is transmitted using a transmitter of the wireless communication device, wherein re-tuning the receiver comprises re-tuning an oscillator shared between the transmitter and the receiver.

AAA6. The method of any of embodiments AAA1-AAA5, wherein the response window starts in an earliest control resource set that begins at least one symbol after the last symbol of the random access channel occasion.

AAA7. The method of embodiment AAA6, wherein said earliest control resource set is a control resource set that the wireless communication device is configured to receive a Physical Downlink Control Channel, PDCCH, for a Type1-PDCCH common search space, CSS, set.

AAA8. The method of any of embodiments AAA1-AAA7, wherein the wireless communication device is operating as a half-duplex frequency division duplex, FDD, device or is operating as a time division duplex, TDD, device.

AAA9. The method of any of embodiments AAA1-AAA8, further comprising selecting the random access channel occasion, in which to transmit the random access preamble, from a set of random access channel occasions that are frequency multiplexed across a frequency bandwidth wider than a transmit bandwidth of the wireless communication device.

AAA10. The method of any of embodiments AAA1-AAA9, wherein the random access channel occasion is included in a set of random access channel occasions that are frequency multiplexed across a frequency bandwidth wider than a transmit bandwidth of the wireless communication device.

AAA11. The method of any of embodiments AAA1-AAA10, further comprising, before the start of the response window, transmitting an indication of a transmit bandwidth of the wireless communication device and/or a receive bandwidth of the wireless communication device.

AAA12. The method of embodiment AAA11, wherein transmitting the random access preamble comprises transmitting a message that includes the random access preamble, wherein the indication is included in the message.

AAA13. The method of any of embodiments AAA1-AAA12, further comprising selecting, based on a transmit bandwidth of the wireless communication device, at least one of any one or more of:
- the random access preamble to transmit;
- a sequence associated with the random access preamble to transmit;
- a format of the random access preamble to transmit;
- a length of the random access preamble to transmit; and
- a time and/or frequency resource for the random access channel occasion in which the random access preamble is to be transmitted.

AAA14. The method of any of embodiments AAA1-AAA13, further comprising receiving (700), from the wireless communication network, a random access configuration (30) indicating the start of the portion of the response window.

AAA15. The method of embodiment AAA14, wherein the random access configuration is included in system information broadcast from the wireless communication network.

AAA16. The method of embodiment AAA14, wherein the random access configuration is received in dedicated Radio Resource Control, RRC, signaling.

AAA17. The method of any of embodiments AAA14-AAA16, wherein the random access configuration is received from a first cell or on a first carrier, first band, or first frequency, wherein the random access configuration is applicable for random access to a second cell or on a second carrier, second band, or second frequency.

AAA18. The method of any of embodiments AAA1-AAA17, wherein the portion of the response window begins a certain number of symbols after a start of the response window, wherein the certain number of symbols is 2, 3, 6, 12, or 24.

AAA19. The method of any of embodiments AAA1-AAA18, further comprising determining the start of the portion of the response window based on a radio frequency re-tuning time of the wireless communication device, and/or a subcarrier spacing for the response, and/or a length of the response window, and/or a frequency location of the earliest control resource set.

AAA20. The method of any of embodiments AAA1-AAA19, further comprising determining the start of the portion of the response window as a function of $\lceil R/S \rceil$, where R is a radio frequency re-tuning time of the wireless communication device, S is a subcarrier spacing for the response, and $\lceil\ \rceil$ is a ceiling function.

AAA21. The method of any of embodiments A1-AAAAA20, further comprising determining the start of the portion of the response window as a function of:
- whether the wireless communication device is operating as a full-duplex device or a half-duplex device;
- whether the wireless communication device is operating as a half-duplex Type A device or a half-duplex Type B device; and/or
- whether the wireless communication device is operating as a frequency-division duplex device or a time-division duplex device.

AAA22. The method of any of embodiments AAA1-AAA21, further comprising determining the start of the portion of the response window as a function of a transmit frequency at which the wireless communication device transmits the random access preamble and/or a receive frequency at which the wireless communication device monitors for the response.

AAA23. The method of any of embodiments AAA1-AAA22, further comprising determining the start of the portion of the response window as a function of a transmit bandwidth of the wireless communication device.

AAA24. The method of any of embodiments AAA1-AAA23, wherein the response window starts at a first symbol of an earliest control resource set that begins at least one symbol after the last symbol of the random access channel occasion.

AAA25. The method of embodiment AAA24, wherein said earliest control resource set is an earliest control resource set:
- that the wireless communication device is configured to receive a Physical Downlink Control Channel, PDCCH, for a Type1-PDCCH common search space, CSS, set; and
- that begins at least one symbol after the last symbol of the random access channel occasion.

AA. The method of any of the previous embodiments, further comprising:
- providing user data; and
- forwarding the user data to a host computer via the transmission to a base station.

Group X Embodiments

X1. A method performed by a wireless communication device (12), the method comprising:
- receiving (1010) a random access configuration (40) that indicates, from a set (42) of possible numbers of frequency division multiplexed random access channel occasions, a number (N) of random access channel occasions (18-1 . . . 18-N) to be frequency division multiplexed, wherein the set of possible numbers includes at least one number that is not a power of 2.

X2. The method of embodiment X1, wherein the set of possible numbers includes at least 3 and/or 6 and/or 12.

X3. The method of any of embodiments X1-X2, wherein the set of possible numbers includes at least 1, 2, 3, 4, 6, and 8.

X4. The method of any of embodiments X1-X3, wherein the set of possible numbers includes at least 6 and 8.

X5. The method of any of embodiments X1-X4, wherein the set of possible numbers includes at least 4 and 6.

X6. The method of any of embodiments X1-X5, wherein the set of possible numbers includes at least 2 and 3.

X7. The method of embodiment X1, wherein the set of possible numbers is {1, 2, 3, 4, 6, 8}.

X8. The method of embodiment X1, wherein the set of possible numbers is {1, 2, 4, 6} or {1, 2, 3, 4}.

X9. The method of any of embodiments X1-X8, wherein Nmax is a maximum of the possible numbers included in the set, and wherein Nmax frequency division multiplexed random access channel occasions span a frequency bandwidth wider than a transmit bandwidth of the wireless communication device.

X10. The method of embodiment X9, wherein Nmax is a power of 2.

X11. The method of any of embodiments X1-X10, further comprising, before receiving the random access configuration, transmitting (1000) an indication of a transmit bandwidth of the wireless communication device and/or a receive bandwidth of the wireless communication device.

X12. The method of embodiment X11, further comprising transmitting a message that includes a random access preamble, wherein the indication is included in the message.

X13. The method of any of embodiments X1-X12, further comprising selecting, based on a transmit bandwidth of the wireless communication device, at least one of any one or more of:

a random access preamble to transmit;

a sequence associated with the random access preamble to transmit;

a format of the random access preamble to transmit;

a length of the random access preamble to transmit; and a time and/or frequency resource for a random access channel occasion in which the random access preamble is to be transmitted.

X14. The method of any of embodiments X1-X13, wherein the random access configuration is included in system information broadcast from the wireless communication network.

X15. The method of any of embodiments X1-X13, wherein the random access configuration is received in dedicated Radio Resource Control, RRC, signaling.

X16. The method of any of embodiments X1-X15, wherein the random access configuration is received from a first cell or on a first carrier, first band, or first frequency, wherein the random access configuration is applicable for random access to a second cell or on a second carrier, second band, or second frequency.

X17. The method of any of embodiments X1-X16, further comprising:

selecting (1020), from the number of random access channel occasions to be frequency division multiplexed according to the received random access configuration, a random access channel occasion in which to transmit a random access preamble; and transmitting (1030) the random access preamble in the selected random access channel occasion.

XX1. A method performed by a wireless communication device (12), the method comprising:

selecting (1410), from a proper subset (50S) of frequency division multiplexed random access channel occasions included in a set (50), a random access channel occasion (18) in which to transmit a random access preamble (14); and transmitting (1420) the random access preamble in the selected random access channel occasion.

XX2. The method of embodiment XX1, wherein the frequency division multiplexed random access channel occasions included in the set span a frequency bandwidth wider than a transmit bandwidth of the wireless communication device, and wherein the frequency division multiplexed random access channel occasions included in the proper subset span a frequency bandwidth less than or equal to the transmit bandwidth of the wireless communication device.

XX3. The method of any of embodiments XX1-XX2, wherein the frequency division multiplexed random access channel occasions included in the proper subset are positioned in frequency below a maximum frequency, are positioned in frequency above a minimum frequency, or are positioned in frequency between the maximum frequency and the minimum frequency.

XX4. The method of any of embodiments XX1-XX3, wherein the frequency division multiplexed random access channel occasions included in the proper subset are positioned within a transmit bandwidth of the wireless communication device.

XX5. The method of any of embodiments XX1-XX4, wherein the frequency division multiplexed random access channel occasions included in the proper subset are positioned within a frequency range coinciding with a frequency location of a control resource set used for monitoring for a response to the random access preamble.

XX6. The method of any of embodiments XX1-XX5, further comprising receiving (1400) a random access configuration (60) indicating the proper subset.

XX7. The method of embodiment XX6, further comprising, before receiving the random access configuration, transmitting an indication of a transmit bandwidth of the wireless communication device and/or a receive bandwidth of the wireless communication device.

XX8. The method of embodiment XX7, further comprising transmitting a message that includes a random access preamble, wherein the indication is included in the message.

XX9. The method of any of embodiments XX6-XX8, wherein the random access configuration is included in system information broadcast from the wireless communication network.

XX10. The method of any of embodiments XX6-XX8, wherein the random access configuration is received in dedicated Radio Resource Control, RRC, signaling.

XX11. The method of any of embodiments XX6-XX10, wherein the random access configuration is received from a first cell or on a first carrier, first band, or first frequency, wherein the random access configuration is applicable for random access to a second cell or on a second carrier, second band, or second frequency.

XX12. The method of any of embodiments XX1-XX11, further comprising selecting, based on a transmit bandwidth of the wireless communication device, at least one of any one or more of:

the random access preamble to transmit;

a sequence associated with the random access preamble to transmit;

a format of the random access preamble to transmit;

a length of the random access preamble to transmit; and a time and/or frequency resource for a random access channel occasion in which the random access preamble is to be transmitted.

XX. The method of any of the previous embodiments, further comprising:

providing user data; and forwarding the user data to a host computer via the transmission to a base station.

Group B Embodiments

B1. A method performed by a radio network node (16) of a wireless communication network (10), the method comprising:

receiving (510), from a wireless communication device (12), a random access preamble (14) in a random access channel occasion (18) that comprises one or more symbols; and transmitting (520) a response (20) to the random access preamble within a response window (24), wherein the response window starts in an earliest control resource set (22-2) that begins at least a minimum number (Dmin) of symbols after the last symbol (18L) of the random access channel occasion, wherein the minimum number of symbols is greater than one.

B2. The method of embodiment B1, comprising receiving the random access preamble at a receive frequency and transmitting the response at a transmit frequency different than the receive frequency.

B3. The method of any of embodiments B1-B2, wherein one or more control resource sets (22-1) each begin at least one symbol after the last symbol of the random access channel occasion but begin fewer than said minimum number of symbols after the last symbol of the random access channel occasion.

B4. The method of embodiment B3, wherein said earliest control resource set, and each of the one or more control resource sets, is a control resource set that the wireless communication device is configured to receive a Physical Downlink Control Channel, PDCCH, for a Type1-PDCCH common search space, CSS, set.

B5. The method of any of embodiments B3-B4, comprising waiting to transmit the response until at least the start of the response window, wherein said waiting comprises refraining from transmitting the response during said one or more control resource sets.

B6. The method of any of embodiments B1-B5, wherein the wireless communication device is operating as a half-duplex frequency division duplex, FDD, device or is operating as a time division duplex, TDD, device.

B7. The method of any of embodiments B1-B6, further comprising monitoring a set of random access channel occasions that are frequency multiplexed across a frequency bandwidth wider than a transmit bandwidth of the wireless communication device.

B8. The method of any of embodiments B1-B7, wherein the random access channel occasion is included in a set of random access channel occasions that are frequency multiplexed across a frequency bandwidth wider than a transmit bandwidth of the wireless communication device.

B9. The method of any of embodiments B1-B8, further comprising, before the start of the response window, receiving an indication of a transmit bandwidth of the wireless communication device and/or a receive bandwidth of the wireless communication device.

B10. The method of embodiment B9, wherein receiving the random access preamble comprises receiving a message that includes the random access preamble, wherein the indication is included in the message.

B11. The method of any of embodiments B1-610, further comprising transmitting (500), to the wireless communication device, a random access configuration (30) indicating the minimum number of symbols.

B12. The method of embodiment B11, wherein the random access configuration is included in system information broadcast from the radio network node.

B13. The method of embodiment B11, wherein the random access configuration is received in dedicated Radio Resource Control, RRC, signaling.

B14. The method of any of embodiments B11-613, wherein the random access configuration is transmitted from a first cell or on a first carrier, first band, or first frequency, wherein the random access configuration is applicable for random access to a second cell or on a second carrier, second band, or second frequency.

B15. The method of any of embodiments B1-B14, wherein the minimum number of symbols is 2, 3, 6, 12, or 24.

B16. The method of any of embodiments B1-B15, further comprising determining the minimum number of symbols based on a radio frequency re-tuning time of the wireless communication device, and/or a subcarrier spacing for the response, and/or a length of the response window, and/or a frequency location of the earliest control resource set.

B17. The method of any of embodiments B1-B16, further comprising determining the minimum number of symbols as a function of $\lceil R/S \rceil$, where R is a radio frequency re-tuning time of the wireless communication device, S is a subcarrier spacing for the response, and $\lceil\ \rceil$ is a ceiling function.

B18. The method of any of embodiments B1-B17, wherein a reference control resource set is an earliest control resource set that begins at least one symbol after the last symbol of the random access channel occasion, wherein the reference control resource set starts x symbols after the last symbol of the random access channel occasion, and wherein the method further comprising determining the minimum number of symbols as a function of $\lceil R/S \rceil - x$, where R is a radio frequency re-tuning time of the wireless communication device, S is a subcarrier spacing for the response, and $\lceil\ \rceil$ is a ceiling function.

B19. The method of any of embodiments B1-B18, further comprising determining the minimum number of symbols as a function of:

whether the wireless communication device is operating as a full-duplex device or a half-duplex device;

whether the wireless communication device is operating as a half-duplex Type A device or a half-duplex Type B device; and/or whether the wireless communication device is operating as a frequency-division duplex device or a time-division duplex device.

B20. The method of any of embodiments B1-B19, further comprising determining the minimum number of symbols as a function of a transmit frequency at which the wireless communication device transmits the random access preamble and/or a receive frequency at which the wireless communication device monitors for the response.

B21. The method of any of embodiments B1-B20, further comprising determining the minimum number of symbols as a function of a transmit bandwidth of the wireless communication device.

B22. The method of any of embodiments B1-B21, wherein the response window starts at a first symbol of said earliest control resource set.

B23. The method of any of embodiments B1-B22, wherein said earliest control resource set is an earliest control resource set:

that the wireless communication device is configured to receive a Physical Downlink Control Channel, PDCCH, for a Type1-PDCCH common search space, CSS, set; and that begins at least said minimum number of symbols after the last symbol of the random access channel occasion.

BB1. A method performed by a radio network node (16) of a wireless communication network (10), the method comprising:

transmitting (500), to a wireless communication device (12), a random access configuration (30) that configures a response window (24) to be monitored by the wireless communication device for a response (20) to a random access preamble (14) transmitted in a random access channel occasion (18), wherein the random access configuration configures the response window to start in an earliest control resource set t(22-2) hat begins at least a minimum number (Dmin) of symbols after the last symbol (18L) of the random access channel occasion, wherein the minimum number of symbols is greater than one.

BB2. The method of embodiment BB1, further comprising receiving the random access preamble at a receive frequency and transmitting the response at a transmit frequency different than the receive frequency.

BB3. The method of any of embodiments BB1-BB2, wherein one or more control resource sets (22-1) each begin at least one symbol after the last symbol of the random access channel occasion but begin fewer than said minimum number of symbols after the last symbol of the random access channel occasion.

BB4. The method of embodiment BB3, wherein said earliest control resource set, and each of the one or more control resource sets, is a control resource set that the wireless communication device is configured to receive a Physical Downlink Control Channel, PDCCH, for a Type1-PDCCH common search space, CSS, set.

BB5. The method of any of embodiments BB3-BB4, further comprising waiting to transmit the response until at least the start of the response window, wherein said waiting comprises refraining from transmitting the response during said one or more control resource sets.

BB6. The method of any of embodiments BB1-BB5, wherein the wireless communication device is operating as a half-duplex frequency division duplex, FDD, device or is operating as a time division duplex, TDD, device.

BB7. The method of any of embodiments BB1-BB6, further comprising monitoring a set of random access channel occasions that are frequency multiplexed across a frequency bandwidth wider than a transmit bandwidth of the wireless communication device.

BB8. The method of any of embodiments BB1-BB7, wherein the random access channel occasion is included in a set of random access channel occasions that are frequency multiplexed across a frequency bandwidth wider than a transmit bandwidth of the wireless communication device.

BB9. The method of any of embodiments BB1-BB8, further comprising, before the start of the response window, receiving an indication of a transmit bandwidth of the wireless communication device and/or a receive bandwidth of the wireless communication device.

BB10. The method of embodiment BB9, wherein receiving the random access preamble comprises receiving a message that includes the random access preamble, wherein the indication is included in the message.

BB11. The method of any of embodiments BB1-BB10, wherein the random access configuration is included in system information broadcast from the radio network node.

BB12. The method of any of embodiments BB1-BB10, wherein the random access configuration is received in dedicated Radio Resource Control, RRC, signaling.

BB13. The method of any of embodiments BB1-BB12, wherein the random access configuration is transmitted from a first cell or on a first carrier, first band, or first frequency, wherein the random access configuration is applicable for random access to a second cell or on a second carrier, second band, or second frequency.

BB14. The method of any of embodiments BB1-BB13, wherein the minimum number of symbols is 2, 3, 6, 12, or 24.

BB15. The method of any of embodiments BB1-BB14, further comprising determining the minimum number of symbols based on a radio frequency re-tuning time of the wireless communication device, and/or a subcarrier spacing for the response, and/or a length of the response window, and/or a frequency location of the earliest control resource set.

BB16. The method of any of embodiments BB1-BB15, further comprising determining the minimum number of symbols as a function of $\lceil R/S \rceil$, where R is a radio frequency re-tuning time of the wireless communication device, S is a subcarrier spacing for the response, and $\lceil\ \rceil$ is a ceiling function.

BB17. The method of any of embodiments BB1-BB16, wherein a reference control resource set is an earliest control resource set that begins at least one symbol after the last symbol of the random access channel occasion, wherein the reference control resource set starts x symbols after the last symbol of the random access channel occasion, and wherein the method further comprising determining the minimum number of symbols as a function of $$\left\lceil \frac{R}{S} \right\rceil - x,$$

where R is a radio frequency re-tuning time of the wireless communication device, S is a subcarrier spacing for the response, and $\lceil\ \rceil$ is a ceiling function.

BB18. The method of any of embodiments BB1-BB17, further comprising determining the minimum number of symbols as a function of:

whether the wireless communication device is operating as a full-duplex device or a half-duplex device;

whether the wireless communication device is operating as a half-duplex Type A device or a half-duplex Type B device; and/or whether the wireless communication device is operating as a frequency-division duplex device or a time-division duplex device.

BB19. The method of any of embodiments BB1-BB18, further comprising determining the minimum number of symbols as a function of a transmit frequency at which the wireless communication device transmits the random access preamble and/or a receive frequency at which the wireless communication device monitors for the response.

BB20. The method of any of embodiments BB1-BB19, further comprising determining the minimum number of symbols as a function of a transmit bandwidth of the wireless communication device.

BB21. The method of any of embodiments BB1-BB20, wherein the response window starts at a first symbol of said earliest control resource set.

BB22. The method of any of embodiments BB1-BB21, wherein said earliest control resource set is an earliest control resource set:

that the wireless communication device is configured to receive a Physical Downlink Control Channel, PDCCH, for a Type1-PDCCH common search space, CSS, set; and that begins at least said minimum number of symbols after the last symbol of the random access channel occasion.

BBB1. A method performed by a radio network node (16) of a wireless communication network (10), the method comprising:

receiving (810), from a wireless communication device (12), a random access preamble (14) in a random access channel occasion (18);

determining (820), from only a portion (32B) of a response window (32) that corresponds to the random access channel occasion, a time at which to transmit a response (20) to the random access preamble; and transmitting (830) the response at the determined time.

BBB2. The method of embodiment BBB1, wherein the portion of the response window begins a certain number of symbols after a start of the response window.

BBB3. The method of any of embodiments BBB1-BBB2, comprising waiting to transmit the response until at least a beginning of the portion of the response window.

BBB4. The method of any of embodiments BBB1-BBB3, further comprising receiving the random access preamble at a receive frequency and transmitting the response at a transmit frequency different than the receive frequency.

BBB5 The method of any of embodiments BBB1-BBB4, wherein the response window starts in an earliest control resource set that begins at least one symbol after the last symbol of the random access channel occasion.

BBB6. The method of embodiment BBB5, wherein said earliest control resource set is a control resource set that the wireless communication device is configured to receive a Physical Downlink Control Channel, PDCCH, for a Type1-PDCCH common search space, CSS, set.

BBB7. The method of any of embodiments BBB1-BBB6, wherein the wireless communication device is operating as a half-duplex frequency division duplex, FDD, device or is operating as a time division duplex, TDD, device.

BBB8. The method of any of embodiments BBB1-BBB7, further comprising monitoring a set of random access channel occasions that are frequency multiplexed across a frequency bandwidth wider than a transmit bandwidth of the wireless communication device.

BBB9. The method of any of embodiments BBB1-BBB8, wherein the random access channel occasion is included in a set of random access channel occasions that are frequency multiplexed across a frequency bandwidth wider than a transmit bandwidth of the wireless communication device.

BBB10. The method of any of embodiments BBB1-BBB9, further comprising, before the start of the response window, receiving an indication of a transmit bandwidth of the wireless communication device and/or a receive bandwidth of the wireless communication device.

BBB11. The method of embodiment BBB10, wherein receiving the random access preamble comprises receiving a message that includes the random access preamble, wherein the indication is included in the message.

BBB12. The method of any of embodiments BBB1-BBB11, further comprising transmitting (WW400), to the wireless communication device, a random access configuration (30) indicating the start of the portion of the response window.

BBB13. The method of embodiment BBB12, wherein the random access configuration is included in system information broadcast from the wireless communication network.

BBB14. The method of embodiment BBB12, wherein the random access configuration is received in dedicated Radio Resource Control, RRC, signaling.

BBB15. The method of any of embodiments BBB12-BBB14, wherein the random access configuration is transmitted from a first cell or on a first carrier, first band, or first frequency, wherein the random access configuration is applicable for random access to a second cell or on a second carrier, second band, or second frequency.

BBB16. The method of any of embodiments BBB1-BBB15, wherein the portion of the response window begins a certain number of symbols after a start of the response window, wherein the certain number of symbols is 2, 3, 6, 12, or 24.

BBB17. The method of any of embodiments BBB1-BBB16, further comprising determining the start of the portion of the response window based on a radio frequency re-tuning time of the wireless communication device, and/or a subcarrier spacing for the response, and/or a length of the response window, and/or a frequency location of the earliest control resource set.

BBB18. The method of any of embodiments BBB1-BBB17, further comprising determining the start of the portion of the response window as a function of $\lceil R/S \rceil$, where R is a radio frequency re-tuning time of the wireless communication device, S is a subcarrier spacing for the response, and $\lceil\ \rceil$ is a ceiling function.

BBB19. The method of any of embodiments BBB1-BBB18, further comprising determining the start of the portion of the response window as a function of:

whether the wireless communication device is operating as a full-duplex device or a half-duplex device;

whether the wireless communication device is operating as a half-duplex Type A device or a half-duplex Type B device; and/or whether the wireless communication device is operating as a frequency-division duplex device or a time-division duplex device.

BBB20. The method of any of embodiments BBB1-BBB19, further comprising determining the start of the portion of the response window as a function of a transmit frequency at which the wireless communication device transmits the random access preamble and/or a receive frequency at which the wireless communication device monitors for the response.

BBB21. The method of any of embodiments BBB1-BBB20, further comprising determining the start of the portion of the response window as a function of a transmit bandwidth of the wireless communication device.

BBB21. The method of any of embodiments BBB1-BBB22, wherein the response window starts at a first symbol of an earliest control resource set that begins at least one symbol after the last symbol of the random access channel occasion.

BBB22. The method of embodiment BBB21, wherein said earliest control resource set is an earliest control resource set:
that the wireless communication device is configured to receive a Physical Downlink Control Channel, PDCCH, for a Type1-PDCCH common search space, CSS, set; and
that begins at least said certain number of symbols after the last symbol of the random access channel occasion.

BB. The method of any of the previous embodiments, further comprising:
obtaining user data; and
forwarding the user data to a host computer or a wireless device.

Group Y Embodiments

Y1. A method performed by a radio network node (16) of a wireless communication network (10), the method comprising:
transmitting (1110), to a wireless communication device (12), a random access configuration (40) that indicates, from a set (42) of possible numbers of frequency division multiplexed random access channel occasions, a number (N) of random access channel occasions (18-1 . . . 18-N) to be frequency division multiplexed, wherein the set of possible numbers includes at least one number that is not a power of 2.

Y2. The method of embodiment Y1, wherein the set of possible numbers includes at least 3 and/or 6 and/or 12.

Y3. The method of any of embodiments Y1-Y2, wherein the set of possible numbers includes at least 1, 2, 3, 4, 6, and 8.

Y4. The method of any of embodiments Y1-Y3, wherein the set of possible numbers includes at least 6 and 8.

Y5. The method of any of embodiments Y1-Y4, wherein the set of possible numbers includes at least 4 and 6.

Y6. The method of any of embodiments Y1-Y5, wherein the set of possible numbers includes at least 2 and 3.

Y7. The method of embodiment Y1, wherein the set of possible numbers is {1, 2, 3, 4, 6, 8}.

Y8. The method of embodiment Y1, wherein the set of possible numbers is {1, 2, 4, 6} or {1, 2, 3, 4}.

Y9. The method of any of embodiments Y1-Y8, wherein Nmax is a maximum of the possible numbers included in the set, and wherein Nmax frequency division multiplexed random access channel occasions span a frequency bandwidth wider than a transmit bandwidth of the wireless communication device.

Y10. The method of embodiment Y9, wherein Nmax is a power of 2.

Y11. The method of any of embodiments Y1-Y10, further comprising:
before transmitting the random access configuration, receiving (1100) an indication of a transmit bandwidth of the wireless communication device and/or a receive bandwidth of the wireless communication device; and
determining (1110) the random access configuration based on the indication.

Y12. The method of embodiment Y11, further comprising receiving a message that includes a random access preamble, wherein the indication is included in the message.

Y13. The method of any of embodiments Y1-Y12, wherein the random access configuration is included in system information broadcast from the wireless communication network.

Y14. The method of any of embodiments Y1-Y12, wherein the random access configuration is received in dedicated Radio Resource Control, RRC, signaling.

Y15. The method of any of embodiments Y1-Y14, wherein the random access configuration is transmitted from a first cell or on a first carrier, first band, or first frequency, wherein the random access configuration is applicable for random access to a second cell or on a second carrier, second band, or second frequency.

YY1. A method performed by a radio network node (16) of a wireless communication network (10), the method comprising:
monitoring (1510) only a proper subset (50S) of frequency division multiplexed random access channel occasions included in a set (50) for a random access preamble (14) from a wireless communication device (12); and/or
transmitting (1500) a random access configuration (60) indicating the proper subset.

YY2. The method of embodiment YY1, wherein the frequency division multiplexed random access channel occasions included in the set span a frequency bandwidth wider than a transmit bandwidth of the wireless communication device, and wherein the frequency division multiplexed random access channel occasions included in the proper subset span a frequency bandwidth less than or equal to the transmit bandwidth of the wireless communication device.

YY3. The method of any of embodiments YY1-YY2, wherein the frequency division multiplexed random access channel occasions included in the proper subset are positioned in frequency below a maximum frequency, are positioned in frequency above a minimum frequency, or are positioned in frequency between the maximum frequency and the minimum frequency.

YY4. The method of any of embodiments YY1-YY3, wherein the frequency division multiplexed random access channel occasions included in the proper subset are positioned within a transmit bandwidth of the wireless communication device.

YY5. The method of any of embodiments YY1-YY4, wherein the frequency division multiplexed random access channel occasions included in the proper subset are positioned within a frequency range coinciding with a frequency location of a control resource set used for monitoring for a response to the random access preamble.

YY6. The method of any of embodiments YY1-YY5, comprising transmitting the random access configuration indicating the proper subset.

YY7. The method of embodiment YY6, further comprising receiving an indication of a transmit bandwidth of the wireless communication device and/or a receive bandwidth of the wireless communication device, and determining the proper subset based on the indication.

YY8. The method of embodiment YY6, further comprising receiving a message that includes a random access preamble, wherein the indication is included in the message.

YY9. The method of any of embodiments YY6-YY8, wherein the random access configuration is included in system information broadcast from the wireless communication network.

YY10. The method of any of embodiments YY6-YY8, wherein the random access configuration is received in dedicated Radio Resource Control, RRC, signaling.

YY11. The method of any of embodiments YY6-YY10, wherein the random access configuration is transmitted from a first cell or on a first carrier, first band, or first frequency, wherein the random access configuration is applicable for random access to a second cell or on a second carrier, second band, or second frequency.

YY. The method of any of the previous embodiments, further comprising:
obtaining user data; and
forwarding the user data to a host computer or a wireless device.

Group C Embodiments

C1. A wireless device configured to perform any of the steps of any of the Group A or Group X embodiments.

C2. A wireless device comprising processing circuitry configured to perform any of the steps of any of the Group A or Group X embodiments.

C3. A wireless device comprising:
communication circuitry; and
processing circuitry configured to perform any of the steps of any of the Group A or Group X embodiments.

C4. A wireless device comprising:
processing circuitry configured to perform any of the steps of any of the Group A or Group X embodiments; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A or Group X embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A or Group X embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A or Group X embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B or Group Y embodiments.

C10. A radio network node comprising processing circuitry configured to perform any of the steps of any of the Group B or Group Y embodiments.

C11. A radio network node comprising:
communication circuitry; and
processing circuitry configured to perform any of the steps of any of the Group B or Group Y embodiments.

C12. A radio network node comprising:
processing circuitry configured to perform any of the steps of any of the Group B or Group Y embodiments;
power supply circuitry configured to supply power to the radio network node.

C13. A radio network node comprising:
processing circuitry and memory, the memory containing instructions executable by the processing circuitry whereby the radio network node is configured to perform any of the steps of any of the Group B or Group Y embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B or Group Y embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B or Group Y embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A or Group X embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A or Group X embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A or Group X embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A or Group X embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B or Group Y embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A or Group X embodiments.

D28. The method of the previous embodiment, further comprising at the base station, receiving the user data from the UE.

D29. The method of the previous 2 embodiments, further comprising at the base station, initiating a transmission of the received user data to the host computer.

REFERENCES

[1] RP-202933, New WID on support of reduced capability NR devices, 3GPP TSG RAN #90e, December 2020.

[2] TR 38.875, "Study on support of reduced capability NR devices (Release 17)," December 2020.

[3] TS 38.213, "NR; Physical layer procedures for control", V16.1.0, March 2020.

[4] TS 38.331, v. 15.8.0 "NR; Radio Resource Control (RRC) protocol specification"

[5] TS 38.211, v. 15.8.0, "NR; Physical channels and modulation".

What is claimed is:

1. A method performed by a wireless communication device for random access to a wireless communication network, the method comprising:

transmitting, to the wireless communication network, a random access preamble in a random access channel occasion that comprises one or more symbols; and monitoring for a response to the random access preamble within a response window, the response window starting in an earliest control resource set that begins at least a minimum number of symbols after the last symbol of the random access channel occasion, the minimum number of symbols being greater than one and the minimum number of symbols determined as a function of [R/S], where R is a radio frequency re-tuning time of the wireless communication device, S is a subcarrier spacing for the response, and [ ] is a ceiling function.

2. The method of claim 1, further comprising, after transmitting the random access preamble at a transmit frequency, re-tuning a receiver of the wireless communication device to monitor for the response at a receive frequency.

3. The method of claim 2, wherein the random access preamble is transmitted using a transmitter of the wireless communication device, wherein re-tuning the receiver comprises re-tuning an oscillator shared between the transmitter and the receiver.

4. The method of claim 1, wherein one or more control resource sets each begin at least one symbol after the last symbol of the random access channel occasion but begin fewer than said minimum number of symbols after the last symbol of the random access channel occasion.

5. The method of claim 4, wherein said earliest control resource set, and each of the one or more control resource sets, is a control resource set that the wireless communication device is configured to receive a Physical Downlink Control Channel (PDCCH) for a Type1-PDCCH common search space (CSS) set.

6. The method of claim 4, comprising waiting to monitor for the response until the start of the response window, wherein said waiting comprises refraining from monitoring for the response during said one or more control resource sets.

7. The method of claim 1, wherein the wireless communication device is a half-duplex frequency division duplex (FDD) device or is operating as a time division duplex (TDD) device.

8. The method of claim 1, further comprising selecting the random access channel occasion, in which to transmit the random access preamble, from a set of random access channel occasions that are frequency multiplexed across a frequency bandwidth wider than a transmit bandwidth of the wireless communication device.

9. The method of claim 1, further comprising, before the start of the response window, transmitting an indication of a transmit bandwidth of the wireless communication device and/or a receive bandwidth of the wireless communication device.

10. The method of claim 1, further comprising selecting, based on a transmit bandwidth of the wireless communication device, at least one of any one or more of:

the random access preamble to transmit; and a sequence associated with the random access preamble to transmit; and a format of the random access preamble to transmit; and a length of the random access preamble to transmit; and a time and/or frequency resource for the random access channel occasion in which the random access preamble is to be transmitted.

11. The method of claim 1, further comprising receiving, from the wireless communication network, a random access configuration indicating the minimum number of symbols.

12. The method of claim 11, wherein the random access configuration is received from a first cell or on a first carrier, first band, or first frequency, wherein the random access configuration is applicable for random access to a second cell or on a second carrier, second band, or second frequency.

13. The method of claim 1, wherein the minimum number of symbols is 2, 3, 6, 12, or 24.

14. The method of claim 1, further comprising determining the minimum number of symbols based on a radio frequency re-tuning time of the wireless communication device, and/or a subcarrier spacing for the response, and/or a length of the response window, and/or a frequency location of the earliest control resource set.

15. The method of claim 1, wherein a reference control resource set is an earliest control resource set that begins at least one symbol after the last symbol of the random access channel occasion, wherein the reference control resource set starts x symbols after the last symbol of the random access channel occasion.

16. The method of claim 1, further comprising determining the minimum number of symbols as a function of:

whether the wireless communication device is operating as a full-duplex device or a half-duplex device; and/or whether the wireless communication device is operating as a half-duplex Type A device or a half-duplex Type B device; and/or whether the wireless communication device is operating as a frequency-division duplex device or a time-division duplex device; and/or a transmit frequency at which the wireless communication device transmits the random access preamble; and/or a receive frequency at which the wireless communication device monitors for the response; and/or a transmit bandwidth of the wireless communication device.

17. A method performed by a radio network node of a wireless communication network, the method comprising:

receiving, from a wireless communication device, a random access preamble in a random access channel occasion that comprises one or more symbols; and transmitting a response to the random access preamble within a response window, the response window starting in an earliest control resource set that begins at least a minimum number of symbols after the last symbol of the random access channel occasion, the minimum number of symbols being greater than one and the minimum number of symbols determined as a function of [R/S], where R is a radio frequency re-tuning time of the wireless communication device, S is a subcarrier spacing for the response, and [ ] is a ceiling function.

18. A wireless communication device configured for random access to a wireless communication network, the wireless communication device comprising:

communication circuitry; and processing circuitry configured to:

transmit, to the wireless communication network, a random access preamble in a random access channel occasion that comprises one or more symbols; and monitor for a response to the random access preamble within a response window, the response window starting in an earliest control resource set that begins at least a minimum number of symbols after the last symbol of the random access channel occasion, the minimum number of symbols being greater than one and the minimum number of symbols determined as a function of [R/S], where R is a radio frequency re-tuning time of the wireless communication device, S is a subcarrier spacing for the response, and [ ] is a ceiling function.

19. A radio network node configured for use in a wireless communication network, the radio network node comprising:

communication circuitry; and processing circuitry configured to:

receive, from a wireless communication device, a random access preamble in a random access channel occasion that comprises one or more symbols; and transmit a response to the random access preamble within a response window, wherein the response window starts in an earliest control resource set that begins at least a minimum number of symbols after the last symbol of the random access channel occasion, the minimum number of symbols being greater than one and the minimum number of symbols determined as a function of [R/S], where R is a radio frequency re-tuning time of the wireless communication device, S is a subcarrier spacing for the response, and [ ] is a ceiling function.

* * * * *